United States Patent
Yoshioka

(10) Patent No.: US 9,785,028 B2
(45) Date of Patent: Oct. 10, 2017

(54) DISPLAY APPARATUS, DRIVING METHOD THEREOF, AND SCREEN APPARATUS FOR DISPLAYING

(71) Applicant: PIONEER CORPORATION, Kanagawa (JP)

(72) Inventor: Toshihiro Yoshioka, Kanagawa (JP)

(73) Assignee: PIONEER CORPORATION, Kanagawa (JP)

( * ) Notice: Subject to any disclaimer, the term of this patent is extended or adjusted under 35 U.S.C. 154(b) by 134 days.

(21) Appl. No.: 14/831,192

(22) Filed: Aug. 20, 2015

(65) Prior Publication Data

US 2015/0356938 A1    Dec. 10, 2015

Related U.S. Application Data

(63) Continuation of application No. 14/387,411, filed as application No. PCT/JP2012/057609 on Mar. 23, 2012, now abandoned.

(51) Int. Cl.
G02F 1/137 (2006.01)
H04N 9/31 (2006.01)
(Continued)

(52) U.S. Cl.
CPC ............ *G02F 1/137* (2013.01); *G03B 21/10* (2013.01); *G03B 21/62* (2013.01); *G09G 3/002* (2013.01);
(Continued)

(58) Field of Classification Search
None
See application file for complete search history.

(56) References Cited

U.S. PATENT DOCUMENTS 7,336,271 B2    2/2008  Ozeki et al.
7,599,651 B2   10/2009  Kitagawa et al.
(Continued)

FOREIGN PATENT DOCUMENTS

JP    05-191726    7/1993
JP    06-82748     3/1994
(Continued)

OTHER PUBLICATIONS

International Search Report PCT/JP2012/057609 dated Jun. 26, 2012.

*Primary Examiner* — Kenneth B Lee, Jr.
(74) *Attorney, Agent, or Firm* — Young & Thompson

(57) ABSTRACT

To display an image and the back side image in an overlapped state on a screen, with good visibility and see-through capability. The screen scanned with an image light from the projector has an optical layer and a plurality of control electrodes which are arranged side by side along the optical layer. The synchronous controller applies a voltage to the plurality of control electrodes, and, in a scanning period T of the image light, switches the optical state of the screen by the unit of the segmented region, between the visual state and the nonvisual state. The synchronous controller, in the period T, switches the optical state of a plurality of segmented regions 22 in synchronous with the scanning period of the image light, maintains the optical state of a projected region of the screen in the visual state by a voltage with two or more amplitudes.

20 Claims, 23 Drawing Sheets

(51) Int. Cl.
  *G03B 21/10*   (2006.01)
  *G03B 21/62*   (2014.01)
  *G09G 3/00*    (2006.01)
  *G09G 3/18*    (2006.01)

(52) U.S. Cl.
  CPC ............ *G09G 3/18* (2013.01); *H04N 9/3129* (2013.01); *G02F 2001/13756* (2013.01); *G03B 2206/00* (2013.01); *G09G 2310/02* (2013.01); *G09G 2310/08* (2013.01); *G09G 2320/041* (2013.01)

(56) References Cited

U.S. PATENT DOCUMENTS

| | | |
|---|---|---|
| 2005/0243078 A1 | 11/2005 | Ozeki et al. |
| 2007/0195033 A1 | 8/2007 | Hayashi et al. |
| 2007/0196141 A1 | 8/2007 | Kitagawa et al. |
| 2015/0362772 A1* | 12/2015 | Yoshioka ............... G03B 21/60 349/33 |

FOREIGN PATENT DOCUMENTS

| | | | | |
|---|---|---|---|---|
| JP | 06-194627 | | 7/1994 | |
| JP | 2004-184979 | | 7/2004 | |
| JP | 2005114869 A | * | 4/2005 | ........... G02F 1/1333 |
| JP | 2007-219414 | | 8/2007 | |
| JP | 2007-219419 | | 8/2007 | |
| JP | 2010-197486 | | 9/2010 | |

* cited by examiner

DISPLAY APPARATUS, DRIVING METHOD THEREOF, AND SCREEN APPARATUS FOR DISPLAYING

TECHNICAL FIELD

This invention relates to a display apparatus, a driving method thereof, and a screen apparatus for displaying.

BACKGROUND ART

There has been known a display apparatus that projects an image light on a screen and displays the projected image on the screen. As a kind of modulation device, a liquid crystal modulation device is known which can control its transmittance (Patent Literature 1).

CITATION LIST

Patent Literature

PTL1: Japanese Patent Application Laid-Open No. 2007-219419

SUMMARY OF INVENTION

Technical Problem

Here, a modulation screen may be thought and formed with the technology of the liquid crystal modulation device, and the modulation screen may be used as an image displaying screen. In such imaginary display apparatus, the modulation screen is controlled in a scattering and transmitting state, for example, when displaying an image. In the other case, the modulation screen may be controlled in a transparent and transmitting state where the scattering of the incident light is reduced in a small number as to be able for a person to see through the modulation screen and to see the back side thereof. However, even if the modulation screen may be used as a screen for displaying images, the screen is required and needed to be controlled in a scattering state when in an image light projection period. Therefore, it is not possible to overlay the screen displaying image and the back side view of the screen in the screen as to provide a good visibility of the image and a good see-through capability.

As described above, in a display apparatus, a displaying image and a back side image cannot be overlapped in a screen.

Solution to Problem

The invention recited in claim 1 is a display apparatus comprising: a screen having an optical layer whose optical state is changed by applying a voltage and a plurality of control electrodes arranged side by side along the optical layer to apply the voltage to the optical layer; a projector configured to project image light on the screen to display an image; and a controller configured to apply the voltage to the plurality of control electrodes, to switch the optical state of the screen by the unit of each of segmented regions corresponding to the each of the control electrodes, between a predetermined visual state in which the image light is scattered and a nonvisual state which is different from the visual state, in a projection period of the image light, wherein the controller switches the optical state of each of the plurality of segmented regions in the projection period of the image light, in synchronous with the projection of the image light by the projector, to control the optical state of the projected region of the image light in the visual state, and to maintains the optical state as the visual state with the voltage with two or more amplitudes.

The invention recited in claim 11 is a method of driving a display apparatus configured to display an image formed by projected image light from a projector, on a screen having an optical layer whose optical state is changed in accordance with an applied voltage, the display apparatus including a controller that controls the optical state of the screen by: applying the voltage to a plurality of control electrodes arranged side by side along the optical layer, to display the image formed by the image light on the screen which has the plurality of control electrodes; switching the optical state of the screen between a predetermined visual state to scatter the image light and a nonvisual state which is different from the visual state, by the unit of the segmented regions in accordance with the control electrodes, in the projection period of the image light; switching optical states of the plurality of segmented regions in the projection period of the image light, in synchronous with the projection of the image light by the projector, so as to control the optical state of the projected region of the screen to be placed in the visual state; and maintaining the optical state in the visual state with the voltage with two or more amplitudes.

The invention recited in claim 12 is a screen apparatus for displaying comprising: a screen configured to display an image formed by projecting image light, the screen having an optical layer whose optical state is changed by applying a voltage; and a plurality of control electrodes arranged side by side along the optical layer to apply the voltage to the optical layer; and a controller configured to apply the voltage to the plurality of control electrodes, and to switch the optical state of each of segmented regions corresponding with the control electrodes, between a predetermined visual state in which the image light is scattered and a nonvisual state which is different from the visual state, wherein: the controller, in the projection period of the light, switches the optical state of each of the plurality of segmented regions in synchronous with the projection of the image light onto the screen, so as to control the optical state of a projected region of the image light in the visual state, and maintains the optical state as the visual state with the voltage with two or more amplitudes.

DESCRIPTION OF EMBODIMENTS

Hereinafter, the embodiments of the present invention will be described with reference to the drawings.

Embodiment 1

Figure 1:
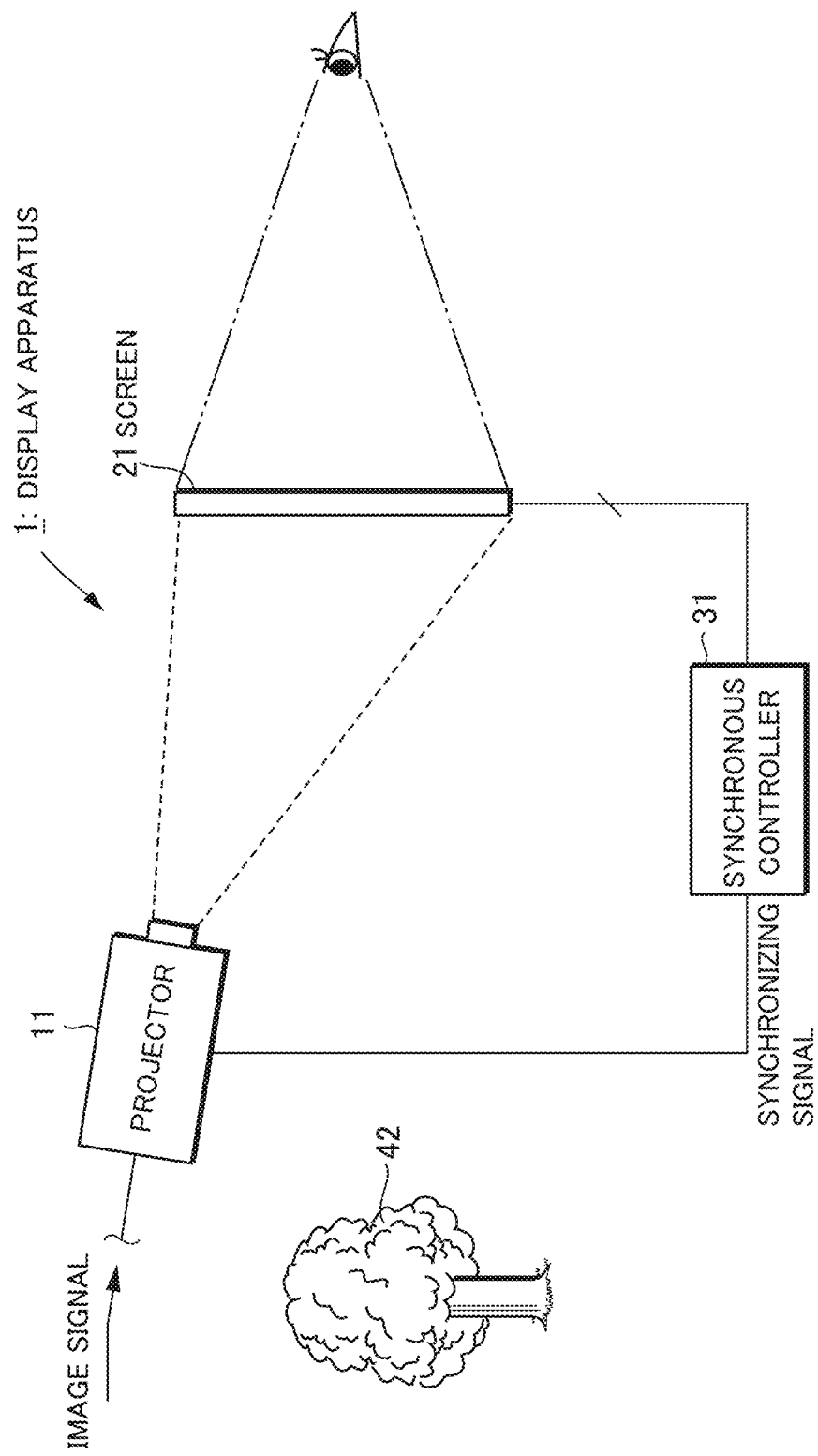
FIG. 1 is a schematic view showing the configuration of a display apparatus according to Embodiment 1 of the present invention.

FIG. 1 is a schematic view showing the configuration of a display apparatus 1 according to Embodiment 1. The display apparatus 1 in FIG. 1 includes a projector 11 projecting an image light, a screen 21 that can be controlled its optical states, and a synchronous controller 31. The synchronous controller 31 is connected to the projector 11 and the screen 21. The display apparatus 1 in the present embodiment is a transmitting type projection apparatus, in which the image light of the projector 11 is transmitted and scattered by the screen 21. The synchronous controller 31 controls the image projected screen 21 in a scattering and transmitting state of the projected image light, and controls the non-image projected screen 21 in a transparent and transmitting state. In the optical states of the screen 21, the scattering and transmitting state is the visual state, and the transparent and transmitting state is the nonvisual state in which the scattering of the incident light is in a lower degree and the transmittance of parallel rays is in a higher degree.

The display apparatus 1 can be used as a signboard for displaying advertisements and so on, for example.

Figure 2:
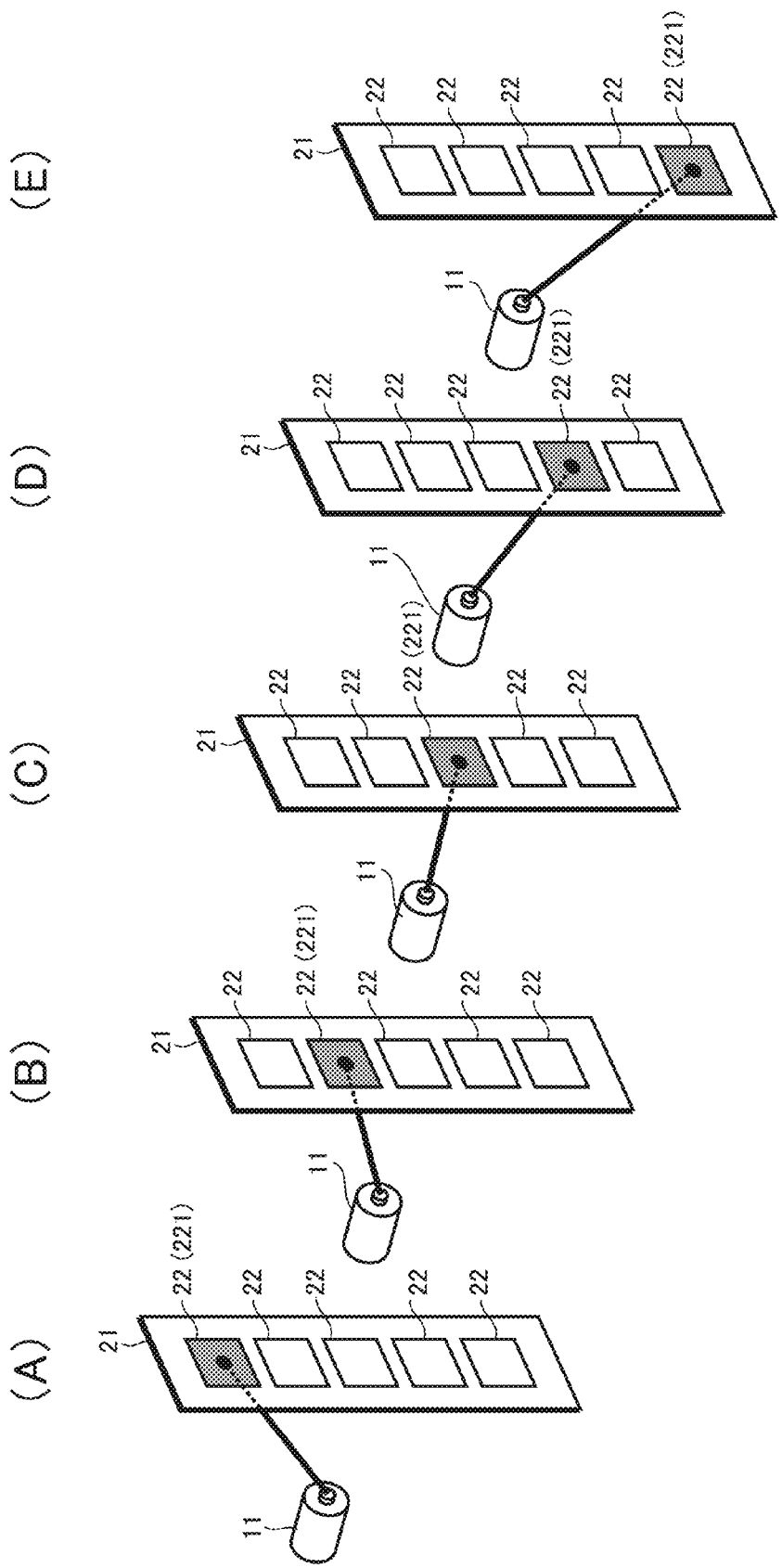
FIG. 2 is a drawing explaining a synchronous control between the scanning and the driving of a screen.

Next, the basic operation principle of the display apparatus 1 in FIG. 1 will be explained. FIG. 2 is a drawing explaining a synchronous control between the scanning and the driving of the screen 21. The projector 11 scans the screen 21 in the vertical direction from the top to the bottom thereof with a modulated image light by the image information. The projector 11 repeatedly scans the screen 21 in the vertical direction from the top to the bottom thereof in every scanning period. FIGS. 2(A) to 2(E) show the scanning states at respective timing in one scanning period in the scanning order. The screen 21 in FIG. 2 has five segmented regions 22. These five segmented regions 22 arranged in the vertical direction along with the scanning direction of the image light. The synchronous controller 31 controls each of optical states of the five segmented regions individually, in synchronism with the one-dimensional scanning in the vertical direction of the screen 21 by the projector 11. When the image light is not projected, each of the segmented regions 22 is controlled in the nonvisual state, that is, in the transparent and transmitting state in which the scattering of the incident light is in low degree.

When the scanning of the image light begins, the scanning light from the projector 11 is firstly is emitted to the top segmented region 22 in the screen 21 as shown in FIG. 2(A). Hereinafter, a reference number 221 will be used for the irradiated segmented region 22 with the scanning light, in order to distinguish it from the other unirradiated segmented regions 22 which are not being scanned. The synchronous controller 31 specifies the period of the top segmented region 221 to be scanned, based on a synchronizing signal from the projector 11, and controls the top segmented region 221 in the visual state. The image light scanning the top segmented region 221 is scattered by the segmented region 221 in the scattering state, and is transmitted as to pass through the screen 21. Next, as shown in FIG. 2(B), the scanning of the image light progresses to the second segmented region 221 from the top of the screen 21. The synchronous controller 31 specifies the period of the second top segmented region 221 to be scanned in the scanning period, and controls the second top segmented region 221 in the visual state. The image light scanning the second top segmented region 221 is scattered by the segmented region 221 in the scattering state, and is transmitted as to pass through the screen 21. After controlling the second top segmented region 221 in the visual state, the synchronous controller 31 controls the top segmented region 22 in the nonvisual state. After that, as shown in FIGS. 2(C) to 2(E), the synchronous controller 31 controls the scanned segmented region 221 with the scanning light in the visual state while controlling the rest segmented regions 22 in the nonvisual state.

By the above described synchronous control, the irradiated region with the scanning light in the screen 21 is maintained in the visual state. By this means, the scanning image light of the screen 21 passes through the screen 21 in the scattering state. Meanwhile, the unirradiated region with the scanning light in the screen 21 is controlled in the nonvisual state. Within the scanning period, each of the segmented regions 22 is mostly controlled in the transparent and transmitting state as the nonvisual state, where the segmented region 22 is not scanned with the scanning light. In the projection period of the image light, a see-through capability of the screen 21 is provided as keeping the image visibility.

The projector 11 may project a modulated image light with image information to the screen 21. Here, the image information is obtained from an inputted image signal to the projector 11. The image signal may be an analog image signal such as in NTSC (National Television Standards Committee) format or in PAL (Phase Alternation by Line) format, or may be a digital image signal such as in MPEG-TS (Moving Picture Experts Group-Transport Stream) format or in HDV (High-Definition Video) format, for example. The projector 11 may not only receive the image signal of a movie, but also receive the image signal of a still image such as in JPEG (Joint Photographic Experts Group) format. In this case, the projector 11 may repeatedly scan the screen 21 with the same image lights of the still image for displaying.

Figure 3:
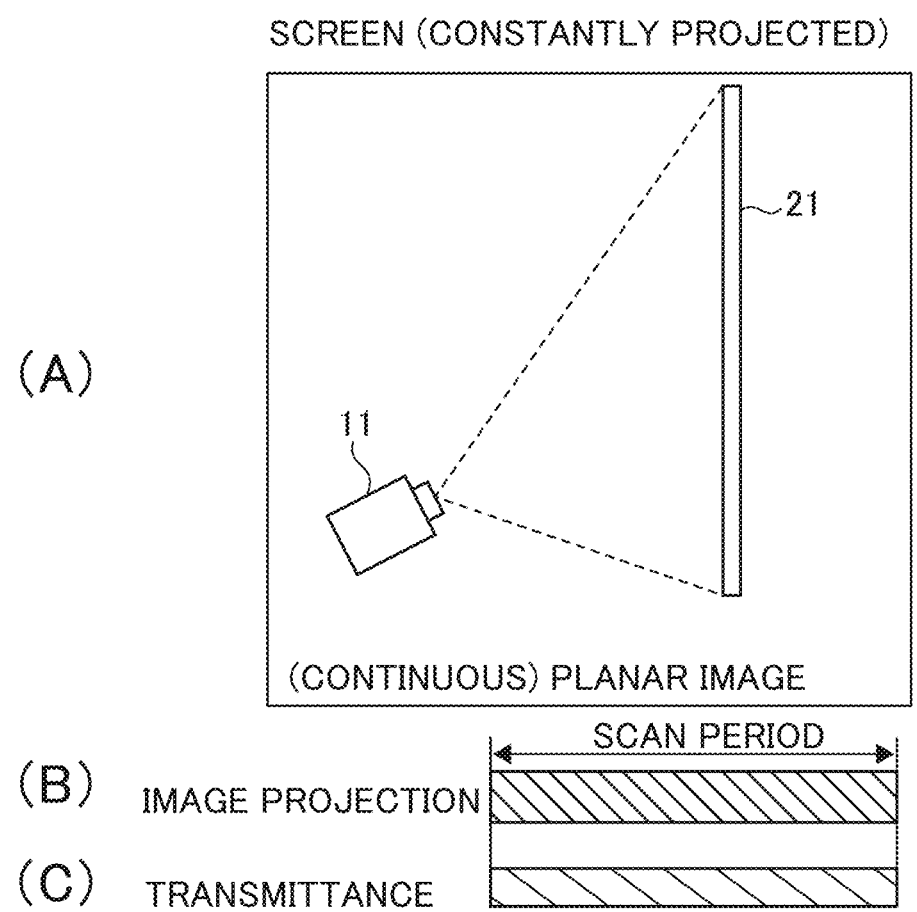
FIG. 3 is a drawing explaining a projector which continuously projects a plane image.
Figure 4:
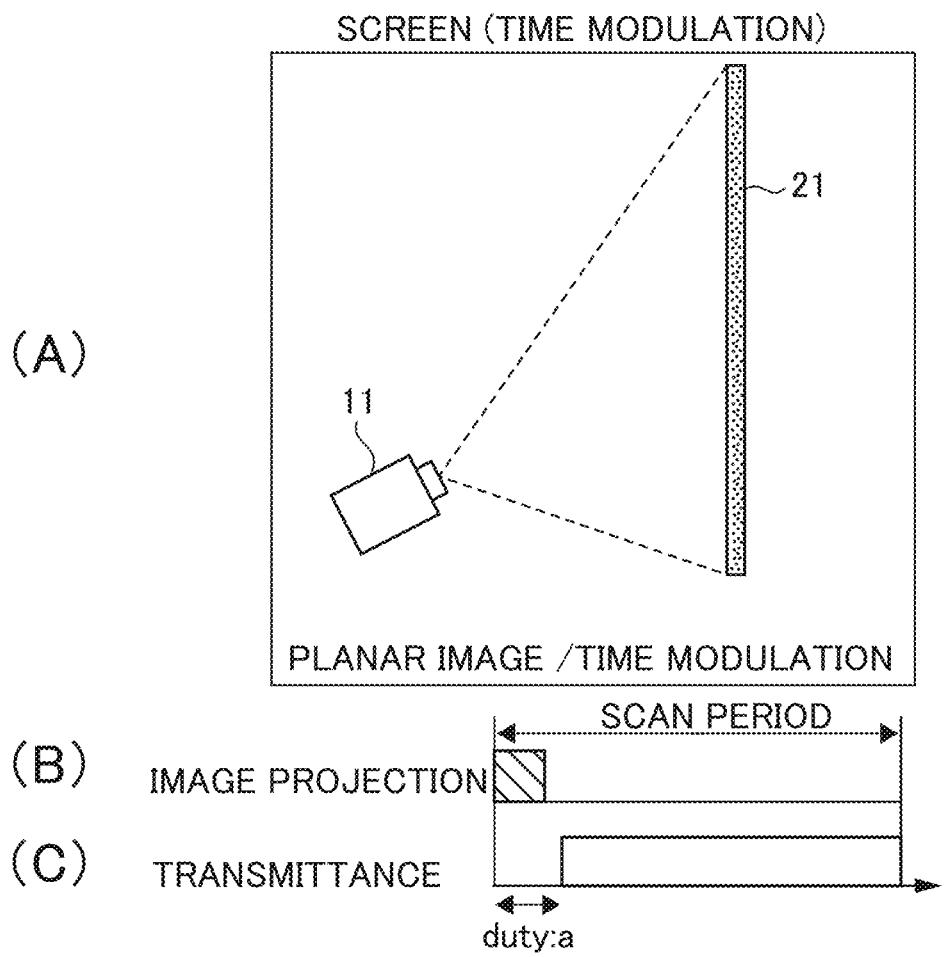
FIG. 4 is a drawing explaining another projector which projects a planar image in a time modulated way.
Figure 5:
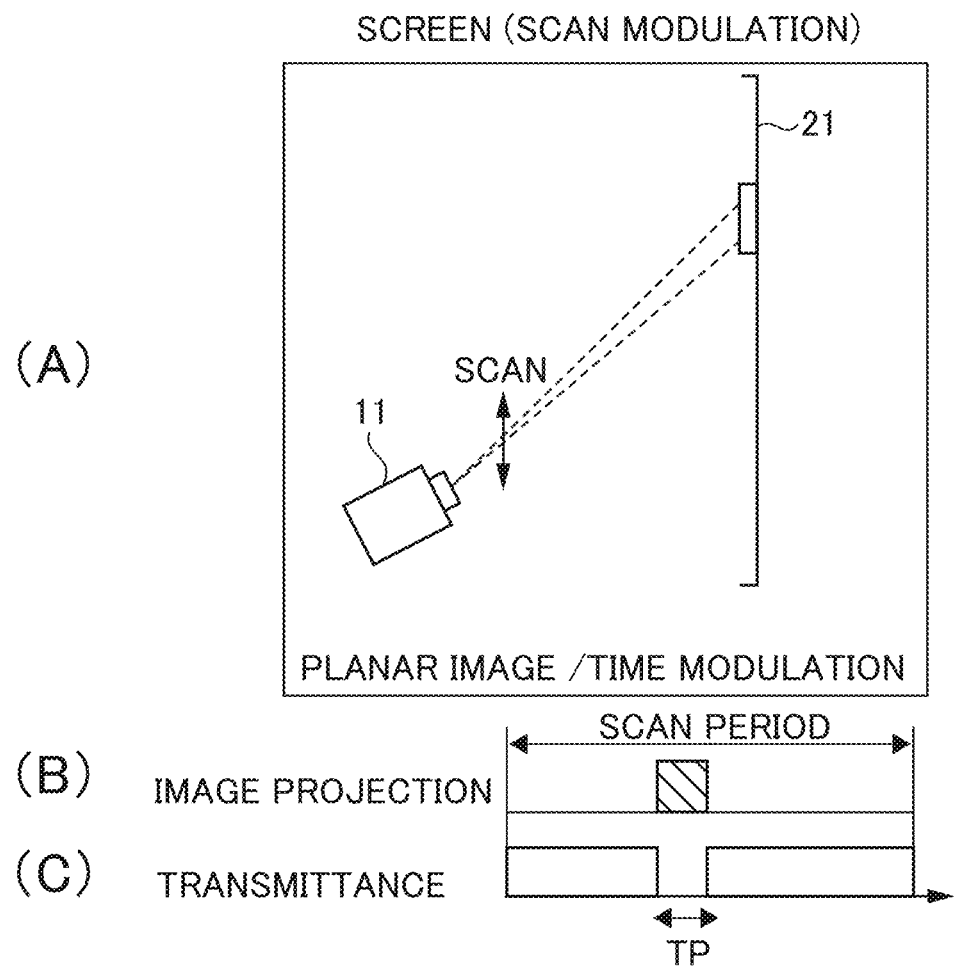
FIG. 5 is a drawing explaining another projector which scans the screen.

FIGS. 3 to 5 are drawings explaining projecting methods of the projector 11. FIG. 3 is a drawing explaining a projector 11 which continuously projects a plane image. FIG. 4 is a drawing explaining another projector 11 which projects a plane image in a time modulated way. FIG. 5 is a drawing explaining another projector 11 which scans the screen 21.

FIG. 3(A) shows a projecting method in which the projector 11 projects image light constantly. In this case, as shown in FIG. 3(B), the image light is continuously projected onto the screen 21 during the scanning period. The screen 21, as shown in FIG. 3(C), is required to be kept in the scattering state continuously. In this case, when the optical state of the screen 21 is controlled to increase the transmittance of parallel rays, the luminance of the visible image is reduced. Here, in FIGS. 3(B) and 3(C), the horizontal axes represent the scanning period (time). The same definitions are applied to FIGS. 4(B) and 4(C) and FIGS. 5(B) and 5(C).

FIG. 4(A) shows another projecting method in which the projector 11 projects image light at some interval. In this case, as shown in FIG. 4(B), the image light is projected onto the screen 21 in a short part time within the scanning period. The screen 21, as shown in FIG. 4(C), may be kept in the scattering state only at a part of the scanning period. Then, during the period other than that part, the optical state of the screen 21 can be controlled to increase the transmittance of parallel rays of the screen 21, and it is possible to achieve the see-through capability of the screen 21 during the scanning period without decreasing the luminance of the visible image. However, in order to obtain the same luminance as in the case of the above constant projection of the image light, as shown "duty: a" in FIG. 4(C), it is required to a higher intensity of the projection light at an about approximately inverse number of the duty which is calculated by dividing the scattering state time with one scan period. Therefore, to achieve a high see-through capability, a powerful pulse projection light is required.

FIG. 5(A) shows another projecting method in which the projector 11 scans the screen 21. In this case, the image light is constantly projected onto the screen 21 during the whole scan period. However, as shown in FIG. 5(B), as for each partial region of the screen 21 being paid attention, the image light is projected in a part time during the scanning period. Therefore, as shown in FIG. 5(C), each partial region of the screen 21 is required to be kept in the scattering state during the partial scanning period TP when each partial region is scanned. In addition, each partial region of the screen 21 can be controlled to increase the transmittance of parallel rays during the period other than the partial scanning period TP, and it is possible to achieve the see-through capability of the screen 21 during the scanning period without decreasing the luminance of the visible image.

The projector 11 that projects image light may adopt any one of above described projecting methods. However, in order to reduce unused image light for scattering, the method in FIG. 4 or FIG. 5 is preferred. In addition, a response time is required and needed to change the optical state of the screen 21. Therefore, the projecting method in FIG. 5 is preferred over the method in FIG. 4, because the former method can easily provide the response time than the latter method. Hereinafter, a case in which the projector 11 adopts the method in FIG. 5 will be explained.

With the driving method in FIG. 5, in a scanning period of the image light, linear shaped divided images corresponding to partial regions of the screen 21 are projected on the displaying surface of the screen 21 sequentially. For the projector 11, a transmitting type liquid crystal light bulb or a reflecting type liquid crystal light bulb may be used, which sequentially shifts a black stated area (where the light is not projected) on the screen 21 in the scanning period. Further, other elements than these bulbs may be used. In addition, the projector 11 may perform a raster scan in the scanning period of an image, and may project dotted light images sequentially on the displaying surface of the screen 21. For this projector 11, a laser projector may be used, in which a modulated light beam with an image is reflected by a rotating mirror as to shift the illuminating direction of the beam. This projector 11 may be considered as one kind of a sequential scanning projector, which scans with a lighting spot in one direction of screen 11.

The screen 21 may be changed its optical state by the voltages or currents of inputted electrical signals. For example, a modulation screen and so on may be used as one, the modulation screen being provided with a liquid crystal material and being switched between the scattering state and the transparent and transmitting state where the scattering of the incident light is in low degree. The modulation screen may use liquid crystal elements such as polymer-dispersed liquid crystal (PDLC) and so on, or may use elements to move white powder in transparent cells and so on to be switched between the scattering state and the transparent and transmitting state where the scattering of the incident light is in low degree.

Moreover, the screen 21 may have a plurality of dividing segmented regions 22 of the screen 21, and each of the regions may be switchable at each of respective timings between the scattering state and the transparent and transmitting state where the scattering of the incident light is in lower degree. For example, the screen 21 may have a plurality of strip shaped segmented regions which are corresponding and divided in the main scanning direction (or in the vertical direction of FIG. 2, for example) of the projector 11. In addition to this, the screen 21 may have a plurality of square shaped segmented regions which are corresponding and divided in the scanning direction and in the sub scanning direction (or in the horizontal direction of the image, for example) of the projector 11.

Figure 6:
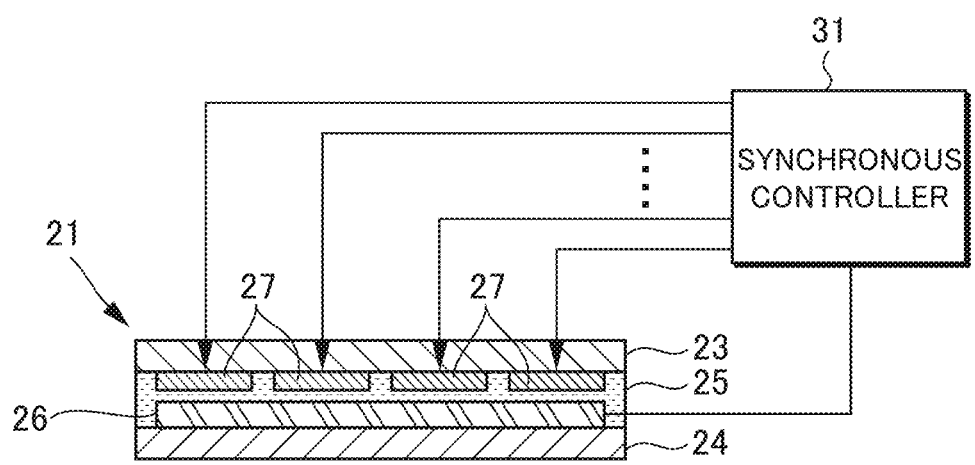
FIG. 6 is a schematic cross-sectional view of a screen.
Figure 7:
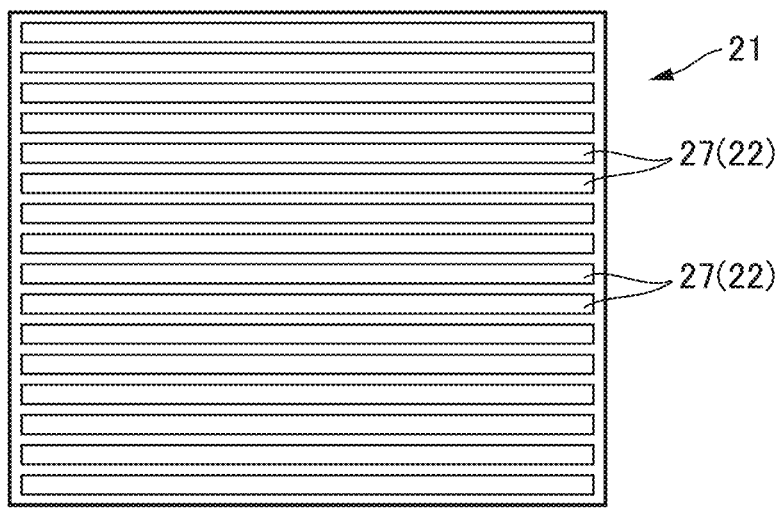
FIG. 7 is a schematic front view of the screen to show the array of a plurality of control electrodes.

FIG. 6 is a schematic cross-sectional view of a screen 21 whose optical state can be controlled by each of segmented regions 22. FIG. 6 also shows the synchronous controller 31. FIG. 7 is a schematic front view of the screen 21 to show the array of a plurality of control electrodes. The exemplary screen 21 in FIG. 6 has an optical layer 25 in which composite material including liquid crystal is sandwiched between a pair of transparent glass plates 23 and 24. On one surface of the glass plate 24 on the side of the optical layer 25, a counter electrode 26 is formed entirely. On one surface of the glass plate 23 on the side of the optical layer 25, a plurality of control electrodes 27 are arranged. Intermediate layers of insulating materials may be formed between the optical layer 25 and the electrodes 26 and 27. The counter electrode 26 and the control electrodes 27 are formed as transparent electrodes by ITO (indium tin oxide). The optical layer 25 is disposed between the plurality of control electrodes 27 and the counter electrode 26.

The plurality of control electrodes 27 are located in the irradiated region of the screen 21 with the image light, and divide by strip shaped regions which are arranged in one direction or in the scanning direction, for example. The plurality of control electrodes 27 are individually connected to the synchronous controller 31, and are applied individual voltages. The control electrodes 27 next to each other are arranged with a space therebetween. In FIG. 6, the counter electrode 26 is connected to the ground. A voltage is applied to the control electrodes 27 as to generate a potential difference with the counter electrode 26. Here, the voltage of a drive waveform described later indicates the potential difference between the control electrodes 27 and the counter electrode 26. The voltage applied to the control electrodes 27 is applied to the optical layer 25 in the corresponding region to the control electrodes 27. In the optical layer 25, the orientation of the liquid crystal molecules is changed by the applied voltage to the control electrodes 27. The optical layer 25 can be controlled by the unit of the segmented region 22, and can be controlled between the transparent and transmitting state in which the scattering degree of the incident light is low and the scattering state in which the incident light is scattered. Here, in the optical layer 25, a gap region is formed at the corresponding region between the control electrodes 27, at the position where the control electrode 27 is not formed. The gap region 28 is formed in the width about 5 to 100 micrometers, and may be formed as narrow width as possible. The thickness of the optical layer 25 is several or several dozen of micrometers, and is determined with the optical capability and the driving voltage being accounted.

The synchronous controller 31 is connected to the projector 11 and the screen 21. The synchronous controller 31 controls the optical state of the screen 21, in synchronous with the projection of the image light from the projector 11. As the synchronizing signal from projector 11 and inputted to the synchronous controller 31, a synchronizing signal can be used, which is synchronous with the scanning period of the projector 11, for example.

As shown in FIG. 7, when the screen 21 is divided into strips in one direction, the projection light of the projector 11 scans them sequentially in the divided direction of the screen 21. Based on the synchronizing signal from the projector 11, the synchronous controller 31 switches the plurality of segmented regions 22 in the scanning order from the transparent and transmitting state to the scattering state, as for the irradiated region of the projection light from the projector 11 to be kept and maintained in the visual state (or in the scattering state as for the present embodiment). By this synchronous control, each of the segmented regions 22 of the screen 21 is placed in the scattering state as the visual state, in the irradiated period Ton which includes the visualizing period and in which each of the segmented regions 22 is irradiated with the projected light. Meanwhile, each of the segmented regions 22 is placed in the transparent and transmitting state as a nonvisual state, in the no visualizing period Toff in which each of the segmented regions 22 is not irradiated with the projected light. The screen 21 can have the transparency as for the back side object to be recognized visually, and also can scatter and transmit the image light in the same brightness when the screen 21 is continuously controlled in the scattering state. That is, it is possible to achieve both of a see-through capability enough for the back side object to be recognized visually and a high visibility of the image.

Figure 8:
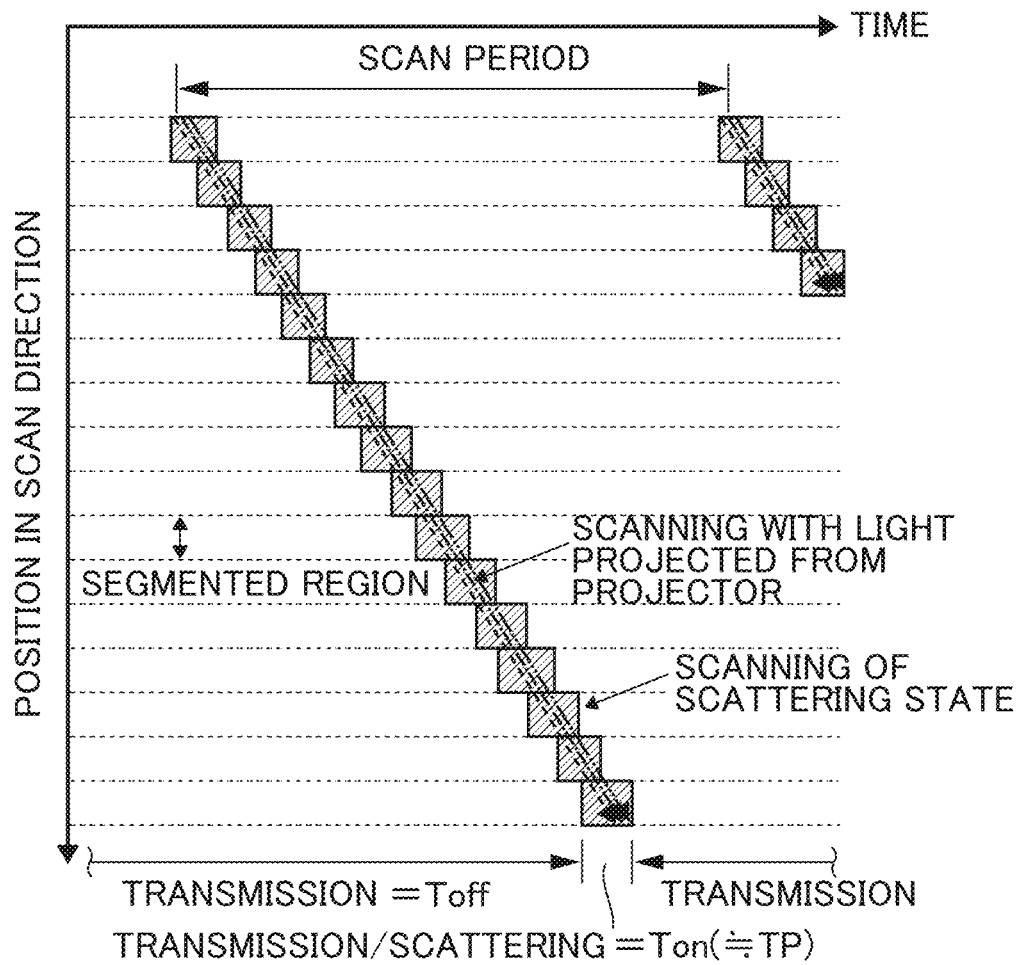
FIG. 8 is a schematic timing chart showing the scanning and the driving of the screen.

FIG. 8 is a schematic timing chart showing the scanning and the driving of the screen 21. The horizontal axis represents time. The vertical axis represents the vertical positions in the vertical direction of the screen 21, and is correspond to the plurality of segmented regions 22 of the screen 21. Before the timing at which each of the segmented regions 22 is started to be scanned with the image light, each of the segmented regions 22 of the screen 21 is controlled and switched to be in the scattering state from the transparent and transmitting state. In addition, after the timing at which each of the segmented regions 22 is finished to be scanned, each of the segmented regions 22 in the scattering state is controlled and switched to the transparent and transmitting state from the scattering state. Each of the plurality of segmented regions 22 is controlled to be placed in the visual state in the partial scanning period TP as synchronous with the irradiation of the scanning image light to the segmented region 22, and therefore can be switched in the visual state sequentially in the scanning order with a shifted time therebetween. The scanning image light of the screen 21 is scattered efficiently by the regions sequentially kept in the visual state, and therefore it is possible to provide high brightness and visibility.

The switch timing information for this synchronous control is transmitted from the projector 11 to the synchronous controller 31, as a synchronizing signal. Preferably, the synchronous controller 31 controls the applying voltages to each of the control electrodes 27, as for the projection light to be irradiated within the period where each of the stabled segmented regions 22 is stabilized in a predetermined scattering state. The optical state of each of the segmented regions 22 is switched, in accordance with the signal waveform of the applied voltage to the control electrodes 27. Particularly, the outputted switch timing information from the projector 11 to the synchronous controller 31 may include both of information of scanning start timings of each of the scanning period by the projector 11 and information of the scanning speed (or the scanning delay/shift time). With the information, even if the frequency of the scanning period is changed, it is possible to follow and to achieve a satisfactory see-through display without distorting the image. Here, the projector 11 and the synchronous controller 31 may wirelessly communicate with one another by using electromagnetic waves such as microwaves or infrared rays, and the synchronizing information may be transmitted and received by the wireless signal.

Figure 9:
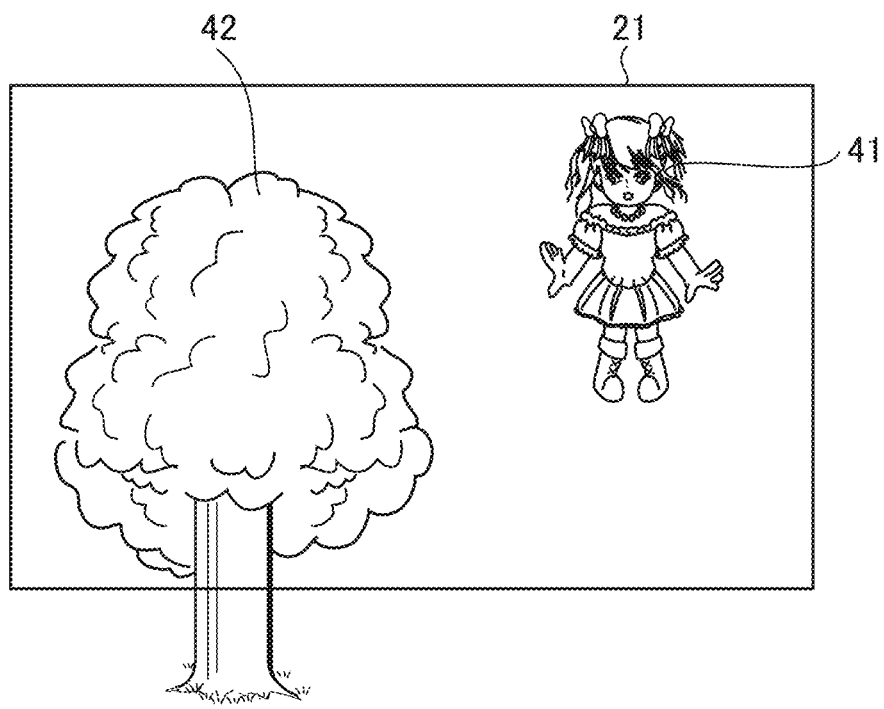
FIG. 9 is a drawing explaining an overlaid displaying state of an image formed by image light and a back side image of the screen.

By the above-described synchronous control, the synchronous controller 31 according to the present embodiment can switch the optical states of the plurality of segmented regions 22 in the scanning period T for scanning with the image light, in synchronous with the scanning of the image light by the projector 11, and controls the optical state of the regions in the visual state where the image light is projected thereon. Therefore, the screen 21 can display the image by the periods Ton including the timings at which the segmented regions 22 are irradiated with the image light, because each of the regions in the screen 21 is kept and maintained in the scattering state when the image light is irradiated thereon. In addition, during the period of time other than the period Ton, each region in the screen 21 is controlled to be in the transparent and transmitting state, and thus it is possible to see through the screen 21 in the projected period of image light. The light passing through the screen 21 can be seen as being averaged (or integrated) with the human eyes, and therefore it is possible to achieve a see-through capability without a flicker, if the scanning period is reasonably short. By this means, under the configuration in FIG. 1, it is possible to visually recognize the image in FIG. 9 on the screen 21. FIG. 9 is a drawing explaining an overlaid displaying state of an image formed by image light and a back side image of the screen 21. In FIG. 9, the image of a person 41 formed by the image light can be seen in the right side of the screen 21, while a back side image of a tree 42 which is located as the back side of the screen 21 can be seen in the left side thereof.

In Embodiment 1, further, a display apparatus 1 will be explained in a case the screen 21 is operated in the normal node. In the normal mode operation of the screen 21, the screen 21 is in the scattering state when in the normal condition where no voltage is applied. When a voltage is applied, the screen 21 is placed in the transparent and transmitting state of the transmittance of parallel rays in accordance with the applied voltage. And, in the optical states of the screen 21, a predetermined scattering state is corresponding with the visual state, and the transparent and transmitting state which has a higher transmittance of parallel rays than that of the scattering state is corresponding with the nonvisual state.

Figure 10:
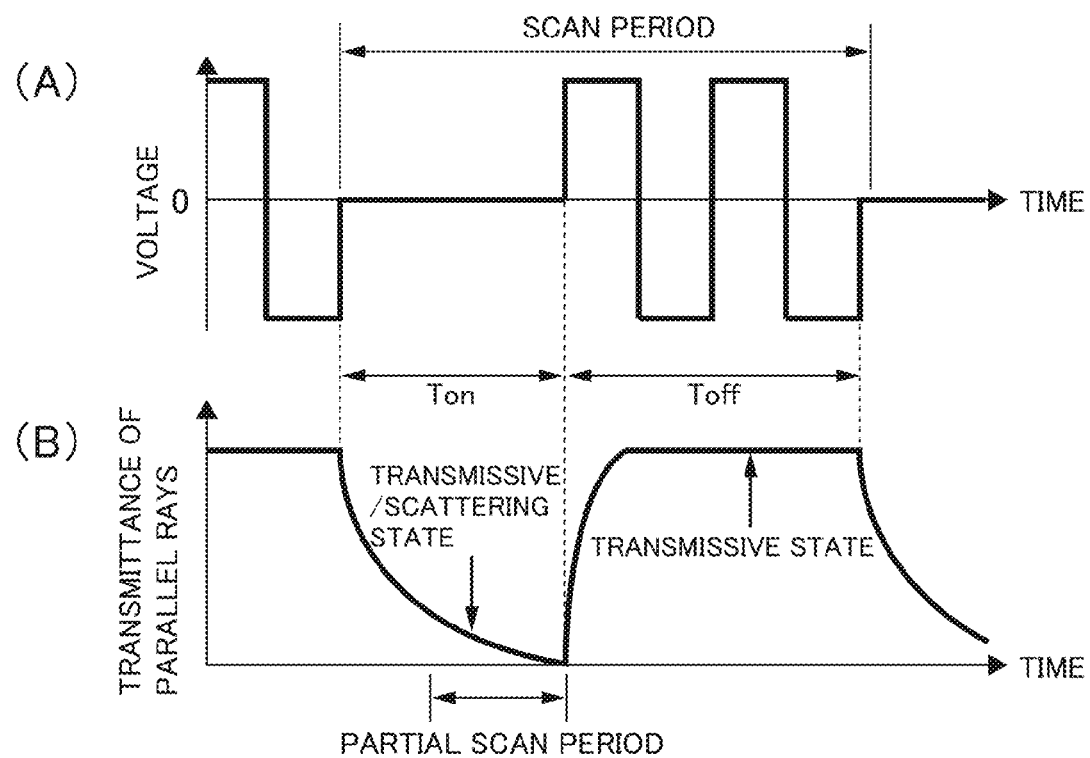
FIG. 10 is a schematic timing chart showing an example of the relationship between a driving voltage waveform and the optical state of the screen in a normal mode common with a conventional one.

FIG. 10 is a schematic timing chart showing an example of the relationship between a driving voltage waveform and the optical state of the screen 21 in a normal mode common with a conventional one, for example. FIG. 10(A) shows the voltage waveform applied by the synchronous controller 31 to the control electrodes 31. The horizontal axis represents the time. The vertical axis represents the voltage. FIG. 10(B) shows the optical state of the optical layer 25. The vertical axis represents the transmittance of parallel rays. When the transmittance of parallel rays is low, that means the scattering is in a high degree.

As shown in FIG. 10, a voltage is applied to the optical layer 25 operated in the normal mode, when the optical layer 25 is in the nonvisual state where no image is displayed. The voltage may be preferred for the transmittance of parallel rays being in the maximum, for example. FIG. 10(A) shows rectangular shaped AC voltage of two cycles as an example of the driving voltage waveform in the nonvisual state to control the segmented regions 22 in the transmitting state, but it does not mean any limiting. When each of the segmented regions 22 is scanned with the image light, the application of the voltage is stopped as for the optical layer 25 of the scanned segmented regions 22 to be in the scattering state. After the voltage is removed, the optical layer 25 gradually changes its state from the transparent and transmitting state to the scattering state. As described above, by applying the driving waveform with 1 level voltage in FIG. 10(A) to each of the control electrodes 27, each of the optical states of the segmented regions 22 corresponding to each of control electrodes 27 can be respectively switched between the transparent and transmitting state and the scattering state in synchronous with the scanning of the screen 21.

However, by switching the application and the termination of the voltage to the normal mode screen 21, it generally takes several milliseconds to several dozen milliseconds until the optical layer 25 is in stable condition where the scattering state is in a certain stable state after terminating the application of the voltage. The screen 21 according to the present embodiment can change the optical state in response to the electrical signal of a voltage or a current, for example. As this screen 21, a modulation screen with a liquid crystal material may be used, that can be switched between the scattering state and the transparent and transmitting state, for example. In general, a modulation material shows a transient response for changing its optical state to the change of electric signal. The optical state does not immediately converge in a certain stable state when a certain electric signal applied or when removed. For example, in a case a modulation screen is provided with a normal mode screen 21 which is in the scattering state when a voltage is not applied, it requires a certain period of time unique to the screen from the timing the voltage is terminated until the timing the optical state is stable in a constant scattering capability, for controlling in a scattering state. As a result, even if the control is performed to switch the optical states of the segmented regions 22 during the scan period, it is not easy to practically control the optical states of the screen 21 between a satisfactorily scattering state of the image light and a state providing a good see-through capability as for back side to be seen well.

When the optical states of the segmented regions 22 are not stabled in a constant scattering state, uneven luminance emerge in the projected image on the screen 21.

First, when each of the optical states of the segmented regions 22 is not stabled in a constant scattering state within its respective partial scan periods TP for scanning each thereof with the image light, scattering degradations emerge in the formed image by scanning of the segmented regions 22 with the image light, in corresponding to the optical state changings within the partial scanning period TP. For example as shown in FIG. 10(B), the image light at the scan start timing of a segmented region 22 is scattered with a lower scattering rate than the image light at the scan end timing of the segmented region 22. As a result, the luminance drops relatively.

Figure 11:
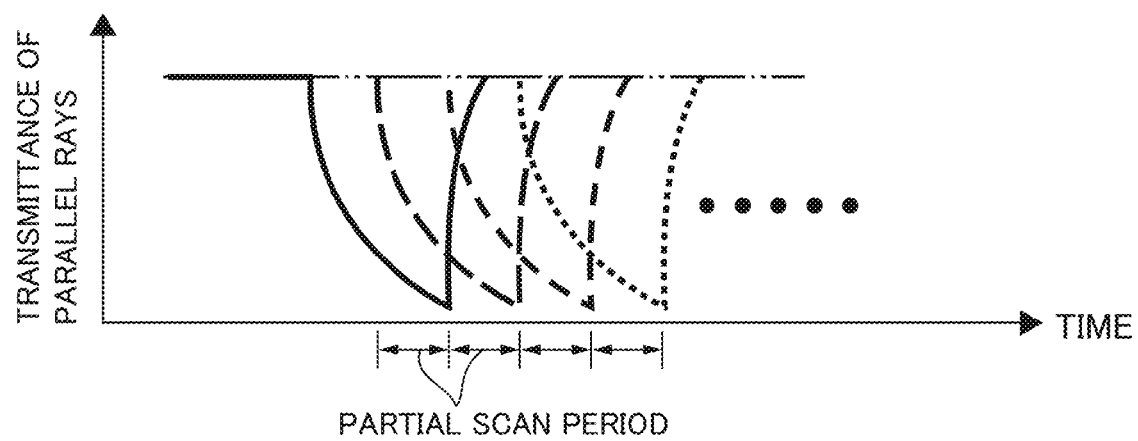
FIG. 11 is a timing chart showing the optical states of a plurality of segmented regions where uneven luminance are emerged in an image.

Secondly, when the optical states of the segmented regions 22 are not stabled in common scattering state, uneven luminance emerge between the segmented regions 22 positioned next to each other and scanned in the order. Particularly, in the peripherals of the boundary regions of the segmented regions 22, contrasts or luminance differences are emerged which are not included in the original image signal, and then strip shaped uneven luminance emerge along with the boundaries. FIG. 11 is a timing chart showing the optical states of a plurality of segmented regions 22 where uneven luminance is emerged in an image. The horizontal axis represents the time, and the vertical axis represents the driving voltage. FIG. 11 shows an example in which the driving voltage waveforms in FIG. 10 are applied to four consecutive segmented regions 22 in synchronous with the scanning of the image light. Therefore, the four driving voltage waveforms are shifted in their timings in synchronous with the scanning. As shown in FIG. 11, in a case in which the segmented regions 22 are sequentially driven at a high speed in synchronous with the scanning with the image light, at the end timing of each partial scanning periods TP, the earlier controlled segmented region 22 in the scattering state is controlled in a strong scattering state, while the later controlled segmented region 22 in the scattering states controlled in a weak scattering state. Here, in FIG. 11, the end timing of each of partial scanning periods TP is described to match with the end timing of each of the periods Ton including the visualizing periods for displaying an image. However, practically, the end timing of the period Ton is slightly later than the end timing of partial scanning period TP. Further, at the end timing of the partial scanning period TP, the scanning image light moves from the former segmented region 22 to the later segmented region 22.

Therefore, at the boundary regions of the segmented regions 22, the intensity of the scattering is discontinuously changed, and therefore strip shaped uneven luminance emerges in the visible image. As described above, when the optical state of the screen 21 is sequentially switched by the unit of the segmented regions 22 in synchronous with the scanning image light, these image quality degradations are required to be reduced. For the purposes, scattering intensities of the scanned regions by the image light are required to be stable in a common state in the scanning periods of the regions by the image light. For example, at the cross timing when the projected light passes across from a former segmented region 22 to a later segmented region 22 in the screen 21, these scattering states of the two segmented regions 22 are required in the same scattering states.

Figure 12:
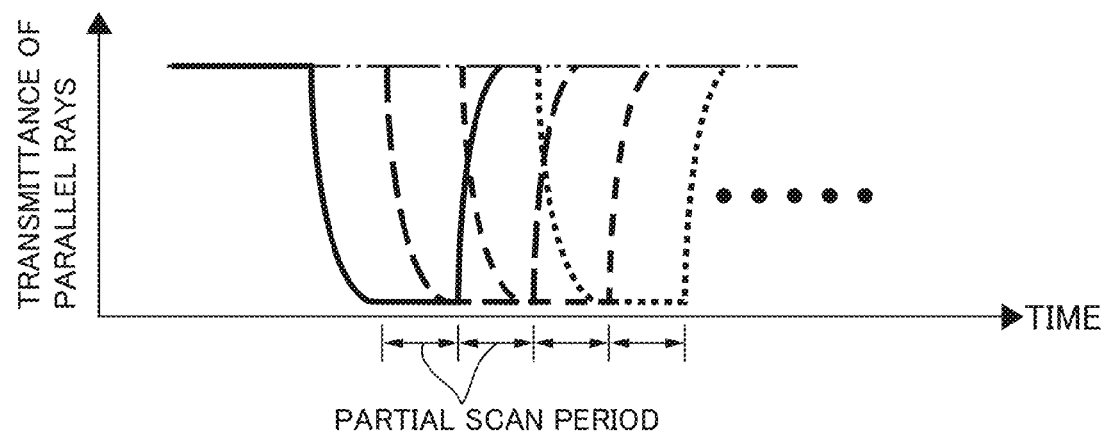
FIG. 12 is a timing chart showing the optical states of the plurality of segmented regions in Embodiment 1.

FIG. 12 is a timing chart showing the optical states of the plurality of segmented regions 22, in which the luminance unevenness can be reduced, according to the present embodiment. The horizontal axis represents the time. The vertical axis represents the transmittance of parallel rays. When the transmittance of parallel rays is low, that means the intensity of the scattering is high. FIG. 12 shows overlapped curve lines that indicate the optical states of four consecutive segmented regions 22. As sequentially switching the optical states of four consecutive segmented regions 22 in synchronous with the scanning image light, in order to reduce the luminance unevenness due to an unstable transmittance of parallel rays, as shown in FIG. 12, each of the segmented regions 22 may be in a common and constant optical state (scattering state) in the respective partial scan periods TP. In addition, at the moving timing when the image light crosses between the adjacent segmented regions 22, the optical states (scattering states) of the adjacent segmented regions 22 may be equalized. With these ways, the optical states of the scanned regions in the screen 21 are controlled in approximately constant state, and therefore the luminance unevenness in an image can be reduced.

Figure 13:
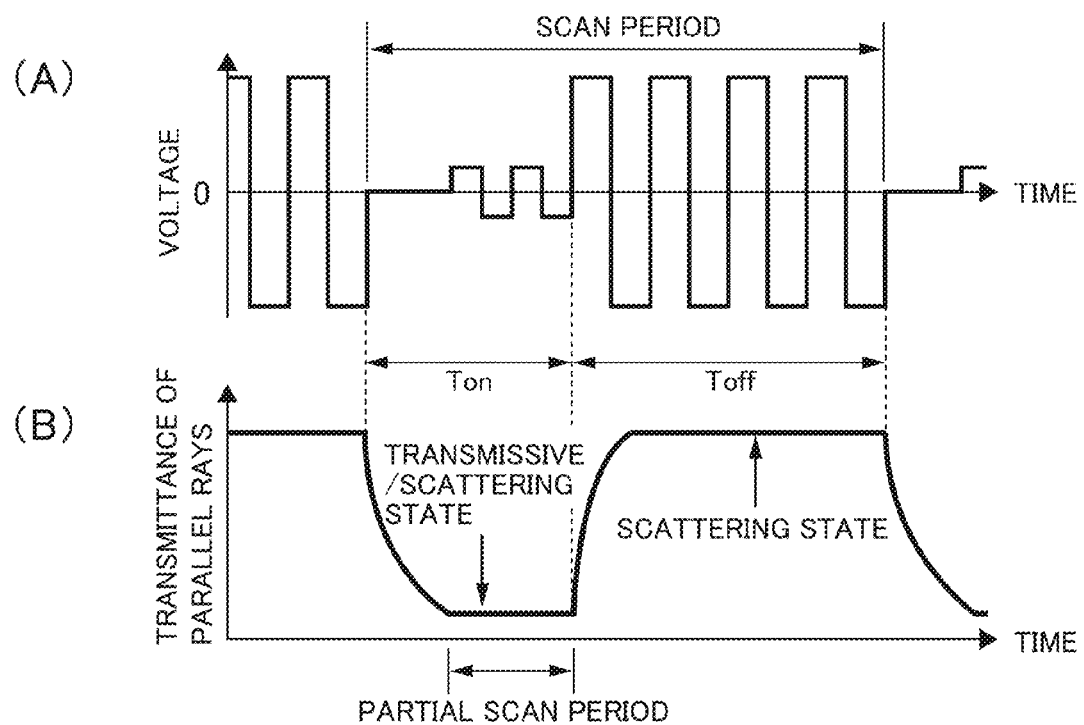
FIG. 13 is a schematic timing chart showing the relationship between a driving voltage waveform with two levels and the optical state in the Embodiment.

FIG. 13 is a schematic timing chart showing the relationship between a driving voltage waveform with two levels and the optical states, according to the present embodiment. FIG. 13(A) shows the driving voltage waveform applied to the screen 21 operated in the normal mode. The horizontal axis represents the time, and the vertical axis represents the voltage. FIG. 13(B) shows the optical state of the screen 21 operated in the normal mode. The horizontal axis represents the time, and the vertical axis represents the transmittance of parallel rays. With the embodiment shown in FIG. 13, first, the application of the driving voltage is stopped, in order for the segmented regions 22 of the screen 21 to control from the transparent and transmitting state to the scattering state. After that, the driving voltage of the lower second level is applied. By applying the second level voltage, the intensity of the scattering can be stabilized in an approximately constant and required value. However, the intensity of the scattering is reduced compared with a case in which the application of the driving voltage is merely stopped and the scattering states of the segmented regions 22 are controlled to its maximum value.

Next, the applying timing of the driving voltage waveform in FIG. 13(A) will be described in detail. When each of the segmented regions 22 is controlled to be placed in the scattering state (visual state) in each of corresponding partial scanning periods TP, the synchronous controller 31 stops the application of the voltage to the control electrode 27 in synchronous with the scanning image light at a little before the timing when the projection light starts to be irradiated to the corresponding segmented regions 22. At the stopping timing of the application of the voltage, the optical layer 25 in the segmented region 22 begins to change from the transparent and transmitting state to the scattering state. The response time of the optical layer 25 is unique to the screen 21 and is influenced by temperature and so forth. Generally, it takes several milliseconds to several dozen milliseconds to reach and stabilize in the maximum scattering state where transmittance of parallel rays is in minimum. After the scanning of the segmented region 22 in the scattering state is ended, the synchronous controller 31 restarts the application of the voltage to the control electrode 27 for controlling the segmented region 22 in the transparent and transmitting state. At this timing, the optical layer 25 of the controlled segmented region 22 begins to change from the scattering state to the transparent and transmitting state. Since these both response times are needed, in a case when the segmented region 22 is switched between the visual state with the minimum transmittance of parallel rays and the transparent and transmitting state as synchronism with the scanning image light, there is not left enough time to achieve both a satisfactory see-through capability and a good visibility. As a result, in order to achieve excellent transparent display (transmissive display in the nonvisual state) which is less influenced with the scattering (haze) in the no visualizing period Toff, it is needed to start the scanning of the image light within a short time after the voltage for the visual state being removed. It is required to start the scanning of the image light in the period when the optical state is changing continuously. Therefore, as shown in FIG. 13(A), pulse voltages or alternative voltages with a plurality of values are applied to keep the scattering state of the segmented region 22 and to stabilize the scattering state in a certain state, before the partial scanning period TP of the segmented region 22.

Figure 14:
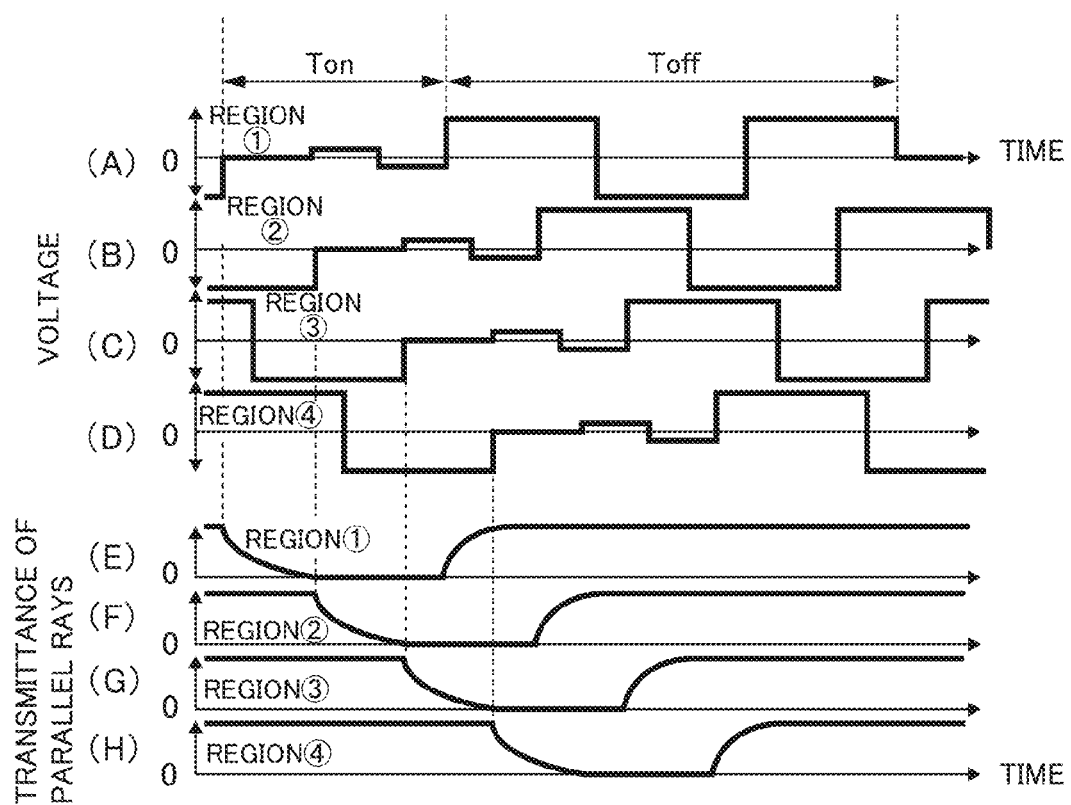
FIG. 14 is a schematic timing chart showing the relationship between driving voltage waveforms with two levels and the optical states of the plurality of control electrodes.

Next, an example in which driving voltages with a plurality of values are applied to the plurality of segmented regions 22 will be described. FIG. 14 is a schematic timing chart showing the relationship between driving voltage waveforms with two levels and the optical states for the plurality of control electrodes 27. FIGS. 14(A) to 14(D) show the applying voltages to four consecutive control electrodes 27. The horizontal axis represents the time, and the vertical axis represents the voltage. FIGS. 14(E) to 14(H) show the corresponding optical capability of the four consecutive segmented regions 22 in FIGS. 14(A) to 14(D). The horizontal axis represents the time, and the vertical axis represents the transmittance of parallel rays. Hereinafter, the change of the optical state will be explained by the change of the transmittance of parallel rays. In the screen of this invention, the decrease of the transmittance of parallel rays means the increase of the scattering. As shown in FIG. 14(A) to (D), a high voltage is applied to each of the four consecutive control electrodes 27 in each of the non-scanned periods in order to control the segmented regions 22 in the transparent and transmitting state. Then, the application of the voltage is terminated before the period for which each of the segmented regions 22 is scanned, and then a low voltage is applied to each of the terminated control electrodes 27. These applied voltages are alternative voltages. With the application, as shown in FIGS. 14(E) to 14(H), the four consecutive segmented regions 22 are controlled to be switched to a constant scattering state from the transparent and transmitting state, in synchronous with the scanning of the image light. In addition, as shown in FIGS. 14(A) to 14(D), a high voltage is applied again to each of the four consecutive control electrodes 27 to control the segmented regions 22 to be placed in the transmitting state, after the scanning of each of the segmented regions 22 is ended. With the applications, as shown in FIGS. 14(E) to 14(H), the four consecutive segmented regions 22 are controlled to be switched from the scattering state to the transparent and transmitting state in synchronism with the scanning of the image light. Here, information on the reference timing for the synchronous control is transmitted from the projector 11 to the synchronous controller 31. Based on the reference timing, the synchronous controller 31 changes the applying voltages to each of the control electrode 27, in order to prevent the projection of the light in the unstable period of the scattering capability.

As described above, according to the present embodiment, the screen 21 is operated in the normal mode in which the transmittance of parallel rays is increased when a voltage is applied, and scatters the projected image light. Meanwhile, the synchronous controller 31 changes the applying voltages to the plurality of segmented regions 22 in the scanning order in a scanning period of the image light; controls each of the segmented regions 22 in the visual state during the partial scanning period TP in which each of the segmented regions 22 is scanned; and controls each of the segmented regions 22 in the nonvisual state during the period other than the partial scanning period TP when each of the segmented regions 22 is not scanned. In addition to this, in order to control each of the segmented regions 22 in the visual state, the synchronous controller 31 increases the applied voltage after stopping the application of the voltage to the control electrode 27; applies the voltage with two amplitudes (plurality of values) to the control electrode 27; controls each of the optical states of the segmented regions 22 to be placed in a predetermined lower scattering state than the maximum scattering state of the segmented regions 22; and stabilizes each of the scattering states of the segmented regions 22 in the partial scanning period TP for the scanning with the image light. As a result, the scattering capability of each of the segmented region 22 within the partial scanning period TP are equalized and maintained in a common value. The irradiated image light to the screen 21 is scattered by the plurality of segmented regions 22 controlled to be placed in a common constant scattering state. The luminance unevenness, which occurs when the scattering state is not controlled in a constant, is reduced in the projected image on the screen 21. In addition, with the present embodiment, since the voltage with two amplitudes is applied to each of the segmented regions 22, there is no need for the scanning to be delayed until the optical state of each of the segmented regions 22 is controlled to be in its maximum, and it is possible to rapidly change the optical states of the plurality of segmented regions 22 enough to synchronism with the scanning of the image light. Therefore, each of the segmented regions 22 can be controlled in the transparent and transmitting state for a long time, enough to increase the see through capability of the screen 21. As a result, it is possible to achieve both of a satisfactory see-through capability of the screen 21 as increasing the brightness of the image. Despite that the response times are long to switch the optical state of the screen 21 in the normal mode, it is possible to keep the transmittance of parallel rays of the screen in the high, and to provide both of a high see-through capability and a good visibility of images of the screen 21. It is possible to display an image by scattering the image light efficiently and evenly as providing a good see-through capability of the screen 21. Particularly, with the present embodiment, the period of time from the voltage being controlled in 0V until the application of a low voltage for stabilizing the scattering state may be 5 milliseconds or less, preferably, 2 milliseconds or less. With above configurations, it is possible to shorten the effective scattering period of each of the segmented regions 22, and therefore possible to keep the transparency of the screen 21 in the high, even when the optical state is controlled and switched in synchronous with the scanning of the image light. Moreover, with the present embodiment, both of a low driving voltage applied to provide a constant scattering state and a high driving voltage applied to provide a transmitting state are applied as alternative voltages with substantially low frequencies. It is preferable to drive liquid crystal elements with an alternative voltage, to reduce the DC component in the applied voltage to the optical layer 25, in order to assure the reliability and to prevent the deterioration thereof. In the normal mode, the no visualizing period Toff in which the segmented regions 22 are controlled in the transmitting state is long, and therefore the effective frequency of the alternative voltage during the transmitting state influences the power consumption. With the present embodiment, the alternative voltage is in the lower frequency as possible, and therefore it is possible to reduce the power consumption.

Embodiment 2

With Embodiment 2, the display apparatus 1 having the screen 21 operated in the reverse mode will be explained. With the screen 21 operated in the reverse mode, the screen 21 is placed in the transparent and transmitting state in the normal state where no voltage is applied thereto. When a voltage is applied, the screen 21 is placed in the scattering state having a corresponding scattering (transmittance) rate of parallel rays to the applied voltage. In the present embodiment, the configuration and the basic operation of the optical apparatus are the same with those of the optical apparatus of Embodiment 1. As for the screen 21, the scattering state corresponds to the visual state.

Figure 15:
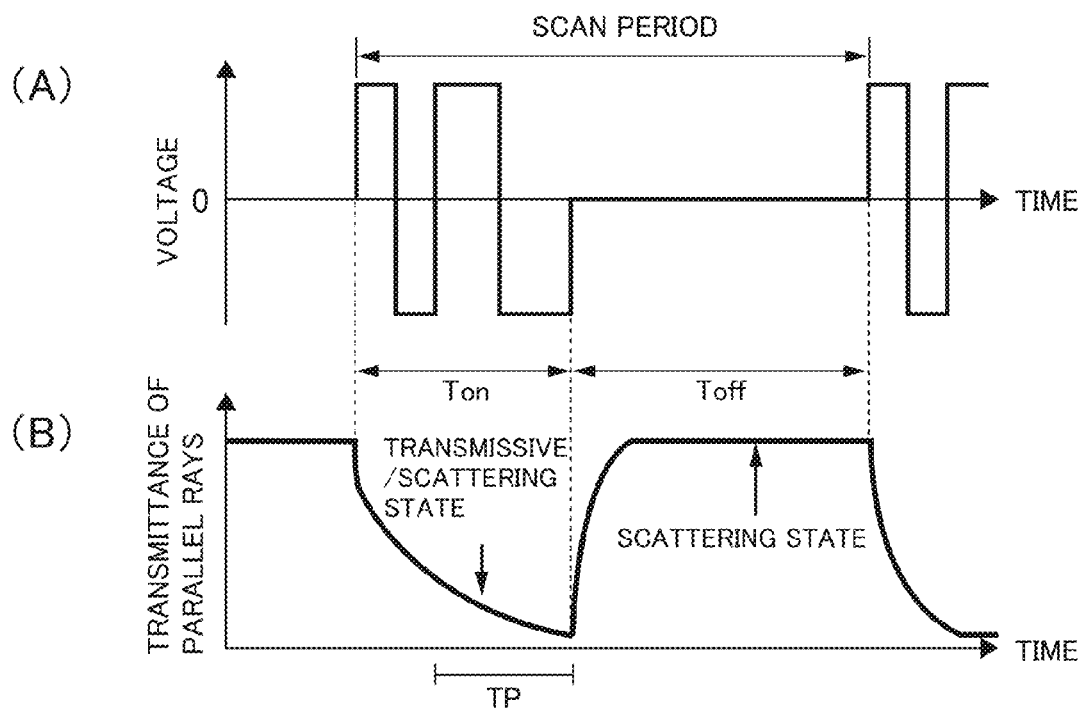
FIG. 15 is a schematic timing chart showing an example of the relationship between a driving voltage waveform and the optical state of the screen in a reverse mode which is common with a conventional one, for example.

FIG. 15 is a schematic timing chart showing an example of the relationship between a driving voltage waveform and the optical state of the screen 21 in a reverse mode which is common with a conventional one, for example. FIG. 15(A) shows a voltage waveform applied to the control electrodes 27. The horizontal axis represents the time. The vertical axis represents the voltage. FIG. 15(B) shows the optical state of the optical layer 25. The vertical axis represents the transmittance of parallel rays. When the transmittance of parallel rays is low, it means that the intensity of the scattering is high. As shown in FIG. 15, in the scanning period of the image light, a voltage is applied to the optical layer 25 operated in the reverse mode during the period Ton including the visualizing period for displaying the image. This voltage may be preferred to be one where the transmittance of parallel rays is in its maximum, for example. In FIG. 15(A), the driving voltage waveform during the period Ton for the scattering state is shown with a rectangular shaped two cycle alternative voltage, for example. But the waveform may not be limited thereto. When the each of the segmented regions 22 is scanned, the voltage is started to be applied for the optical layer 25 of the scanned segmented regions 22 to be placed in the scattering state. After the voltage is applied, the state of the optical layer 25 gradually transfers from the transparent and transmitting state to the scattering state. As described above, by applying the driving voltage waveform in FIG. 15(A) to each of the control electrodes 27, each of the optical states of the segmented regions 22 corresponding to the applied control electrode 27 can be switched respectively between the transparent and transmitting state and the scattering state in synchronous with the scanning of the screen 21.

Figure 16:
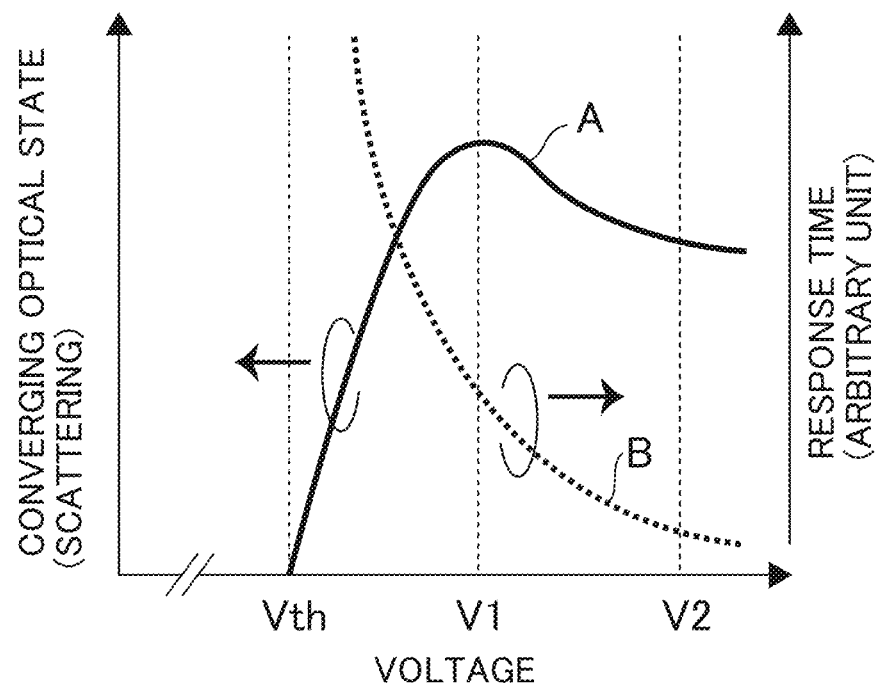
FIG. 16 is a drawing showing an exemplary optical capability of the screen in the reverse mode.

Here, the optical capability of the screen 21 in the reverse mode will be explained. FIG. 16 is a drawing showing an exemplary optical capability of the screen 21 in the reverse mode. The horizontal axis represents the amplitude of the applied voltage. The left vertical axis corresponds to characteristic curve A and represents the convergent optical state (scattering intensity). The right vertical axis corresponds to characteristic curve B and represents the response period. Here, the response period means the period of time, from the start timing of the application of the voltage, until the timing when the optical capability reaches at the 90% of the maximum state in which the scattering intensity is stabilized at the voltage. Then, a threshold voltage Vth is the voltage at which the optical capability begins to change from the optical state at 0V. A first voltage V1 is the voltage at which the convergent optical state (scattering intensity) is in its maximum. A second voltage V2 is a higher one than the first voltage V1.

As shown in FIG. 16, as the voltage applied to the optical layer 25 of the screen 21 in the reverse mode is gradually increased, the convergent scattering intensity is going to change from the state of 0V, when the voltage exceeds the threshold voltage Vth. After that, the scattering intensity changes in accordance with the increment of the applied voltage. When the applied voltage reaches the first voltage V1, the convergent scattering intensity is in its maximum. When the applied voltage exceeds the first voltage V1, the convergent scattering intensity begins to decrease. When the applied voltage is at the second voltage V2, the convergent scattering intensity is lower than that at the first voltage V1. As described above, the optical state is increased and decreased in accordance with the applied voltage and thus has its maximum point in a case.

Independently from the capability, the response time shows an inverse proportion capability, and becomes shorter when the applied voltage to the screen 21 in the reverse mode becomes higher. That is, at the second voltage V2, the optical state can be stabled in a constant value in a short time. As shown in FIG. 16, the response time of the screen 21 becomes longer when the applied voltage is lower. Therefore, in a case the optical state is switched in a short time, for example, in a case the driving voltage waveform is applied in synchronous with the scanning of the image light, it is usually difficult to achieve a stable scattering state within a predetermined period of time with the applied voltage equal to or lower than the first voltage V1. This means that, even if the voltage V1 is applied to achieve the optimal scattering state in the reverse mode, it is difficult to stabilize the optical state of the optical layer 25 in a constant scattering state within the period Ton which includes the visualizing period for the scattering state. Therefore, it is not possible to stabilize the optical states of the segmented regions 22 in the period Ton for the scattering state, and further it is not possible to approximately equalize the optical states of the adjacent segmented regions 22 at the crossing timing of the irradiated image light. As a result, the uneven luminance is visually recognized at and around the boundary of the regions.

As described above, when the screen 21 in the reverse mode is controlled in synchronism with the scanning of the image light, the response times are required to switch the optical state of each of the segmented regions 22 between the transparent and transmitting state and the maximum scattering state. In this case, there is not enough time left in the synchronous scanning period of the image light to scan the segmented region 22 with the image light after waiting the scattering state being stabilized in the maximum state. As a result, it is not possible to achieve a constant scattering state in the partial scanning period TP. That is, even if the maximum scattering state voltage is started to be applied as shown in FIG. 15(B), the optical state of the optical layer 25 is not equalized and stabilized at a constant state within the period of the scattering state. The optical state is not stabilized. When the optical states of the segmented regions 22 are not equalized and stabilized in a constant value, uneven luminance emerge in the projected image on the screen 21.

Figure 17:
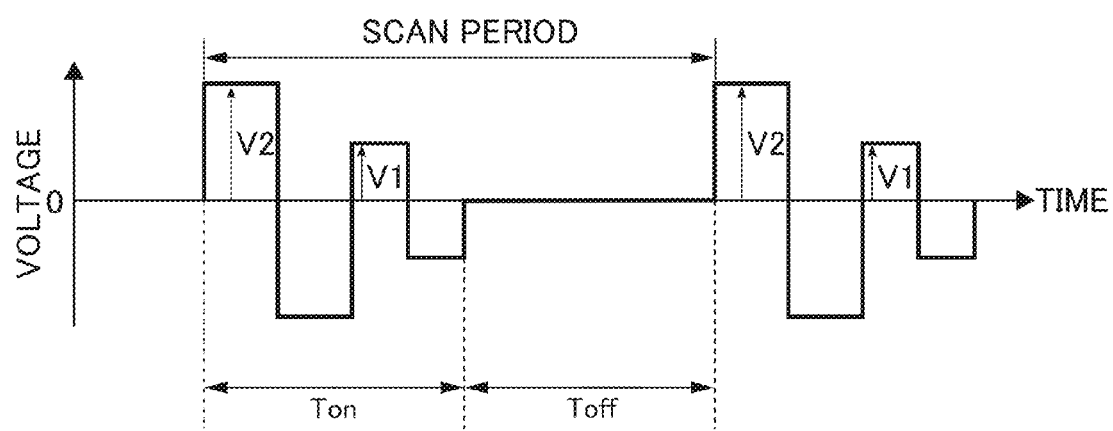
FIG. 17 is a schematic timing chart showing a driving voltage waveform with two levels in Embodiment 2.

To avoid this, the synchronous controller 31 applies a voltage with a plurality of levels to the screen 21 in the reverse mode, during the period TON including the visualizing period for the segmented region 22 to be placed in the scattering state by the applied voltage. FIG. 17 is a schematic timing chart showing a driving voltage waveform with two levels according to Embodiment 2. To be more specific, as shown in FIG. 17, a little time before the projected light is irradiated on the segmented region 22, the synchronous controller 31 first starts applying the voltage waveform of the second voltage V2 to the corresponding control electrode 27 of the segmented region 22. When the second voltage V2 is applied, the response time (rise time) becomes sufficiently fast. When this waveform is continuously applied, the optical capability changes as follows: firstly, scattering intensity becomes in its maximum, then decreased moderately, and converges in a constant value which is slightly lower than the maximum value. That is, when the second voltage V2 is continuously applied, the image light should be irradiated during the time in which the optical state is continuously changing. Therefore, as shown in FIG. 17, the synchronous controller 31 changes and applies the first voltage V1 after applying the second voltage V2. The first voltage V1 is a voltage in which the scattering state is in its approximately maximum. In addition, the first voltage V1 is a voltage with which the optical state can converge in the value at the switching timing from the second voltage V2 to the first voltage V1. Here, both of the first voltage V1 and the second voltage V2 are applied as alternative voltages with a low frequency. Moreover, the first voltage V1 is applied by switching from the second voltage V2 at the timing for the scattering state being in its maximum, within the period in which the scattering state is shifting from moment to moment by the application of the second voltage V2.

As described above, with the present embodiment, by applying the voltage with a plurality of levels, it is possible to maintain the scattering rate (transmittance) of parallel rays at a constant level in the whole period Ton including the visualizing period for the optical layer 25 being in the scattering state. The scattering states are equalized in the partial scan periods TP. Particularly, with the present embodiment, the applied voltage is switched from the second voltage V2 to the first voltage V1 at the maximized scattering state timing under the application of the second voltage V2, such that the scattering state is maximized (and the transmittance of parallel rays is minimized) just at the timing after the application period of the second voltage V2 is ended.

Moreover, as shown in FIG. 17, after the scanning end timing of the segmented region 22 that is controlled in the scattering state, the synchronous controller 31 stops the application of the voltage to the control electrode 27. At this timing, the optical layer 25 of the segmented region 22 begins to change from the scattering state to the transmitting state. With the controls, the plurality of segmented regions 22 can be controlled in the in the scattering state in their arraying order, and each of the controlled segmented regions 22 is maintained in the transmitting state as long as possible in the no visualizing period Toff.

Figure 18:
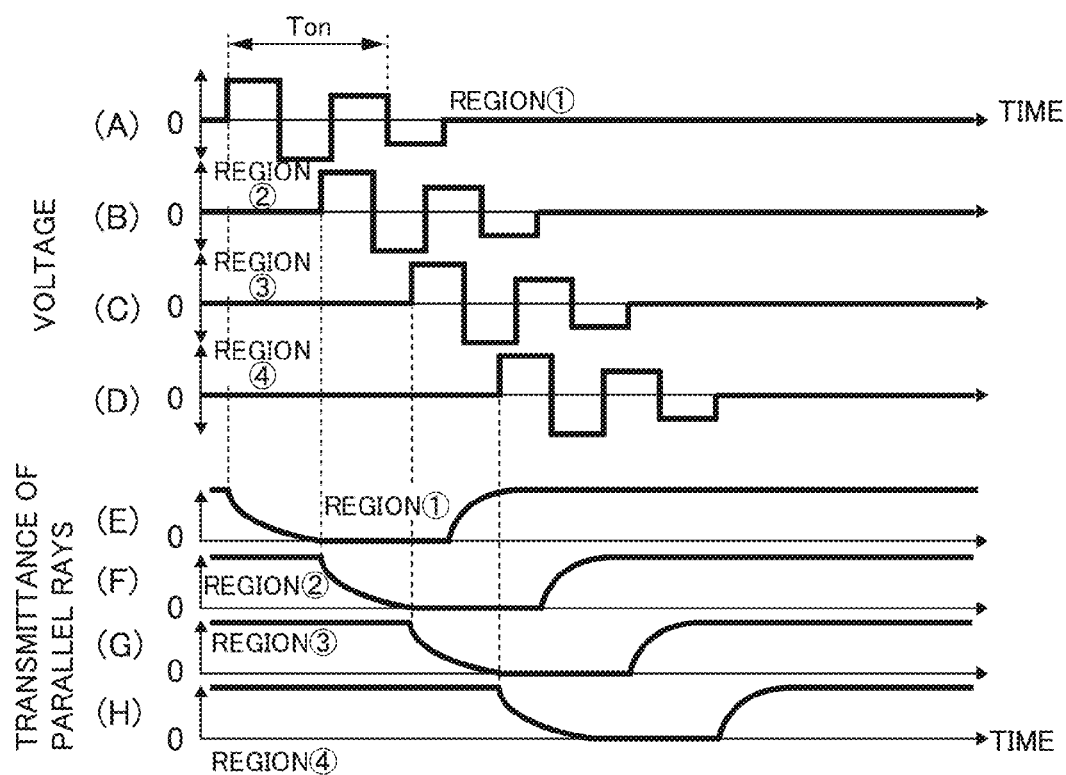
FIG. 18 is a schematic timing chart showing driving voltage waveforms with two levels and the optical state of the plurality of control electrodes.

Next, an example in which the driving voltages with a plurality of values are applied to the plurality of segmented regions 22 will be explained. FIG. 18 is a schematic timing chart showing the driving voltage waveforms with two levels and the optical states of the plurality of control electrodes 27. FIGS. 18(A) to 18(D) show the voltages applied to four consecutive control voltages 27. The horizontal axis represents the time, and the vertical axis represents the voltage. FIGS. 18(E) to 18(H) show the optical capability of the four consecutive segmented regions 22, corresponding to FIGS. 18(A) to 18(D). The horizontal axis represents the time, and the vertical axis represents the transmittance of parallel rays. As shown in FIGS. 18(A) to 18(D), to control the segmented regions 22 in the transmitting states during the no visualizing period Toff for each of the segmented regions 22 being not scanned, the application of the voltage to those four consecutive control electrodes 27 is stopped. Then, the application of the voltage is started before the partial scanning period TP for each of the segmented regions 22 being scanned, and then a lower voltage is applied. The applied voltage is an alternative voltage. By these applications of the voltage waveforms, as shown in FIGS. 18(E) to 18(H), the four consecutive segmented regions 22 are controlled to be switched from the transmitting state to a constant scattering state. In addition, as shown in FIGS. 18(A) to 18(D), to control each of the segmented regions 22 in the transmitting state after the end of the scanning of each of the segmented regions 22, each of the applications of the voltages to the four consecutive control electrodes 27 is stopped. By this application of the voltage waveforms, as shown in FIGS. 18(E) to 18(H), the four consecutive segmented regions 22 are controlled to be switched from the scattering state to the transmitting state. Here, information of the reference timings for the synchronous control is transmitted from the projector 11 to the synchronous controller 31. To prevent the segmented regions 22 from being irradiated with the projected light during the unstable period of the scattering capability, the synchronous controller 31 changes the voltages sequentially applied to the plurality of control electrodes 27 based on the reference timing.

As described above, with the present embodiment, the screen 21 is operated in the reverse mode in which the transmittance of parallel rays is lowered by applying the voltage, and scatters the projected image light. In addition, within the scanning period of the image light, the synchronous controller 31 switches the voltages in the scan order applied to the plurality of segmented regions 22; controls each of the segmented regions 22 to be placed in the visual state during the partial scanning period TP for each of the segmented regions 22 being scanned; and controls each of the segmented regions 22 to be placed in the nonvisual state during the period for each of the segmented regions 22 being not scanned, that is, the period other than the partial scanning period TP. In addition to this, in order to control each of the segmented regions 22 in the visual state, the synchronous controller 31 applies the voltage to the control electrode 27 and then makes the voltage lower to apply the voltage with two amplitudes (a plurality of values); maintains the optical state of the segmented region 22 in a predetermined scattering state which is in a lower degree than the maximum scattering state of the segmented region 22; and equalizes and stabilizes the scattering state of each of the segmented regions 22 during the partial scanning period TP for the scanning of the image light. As a result, the scattering capability of each of the segmented regions 22 is equalized and maintained in a common state during the partial scanning period TP. The projected image light to the screen 21 is scattered by the plurality of segmented regions 22 which are controlled in a constant scattering state. It is possible to reduce the uneven luminance in the displayed image on the screen 21, which emerge when the scattering states thereof are not controlled in a common state. In addition, with the present embodiment, the voltage with two amplitude levels is applied to each of the segmented regions 22, and therefore there is no need to delay the scanning until each of the segmented regions 22 is controlled to be placed in the maximum scattering state. As a result, it is possible to switch the optical state of the plurality of segmented regions 22 at a high speed enough to synchronize it with the scanning of the image light. Therefore, it is possible to control each of the segmented regions 22 to be in the transparent and transmitting state for a long time, and to provide a significant see through capability of the screen 21. As a result, it is possible to achieve both of a satisfactory see-through capability of the screen 21 and a brightness of the image. Despite that the switching response time of the optical state of the screen 21 in the reverse mode is long, it is possible to keep the transmittance of parallel rays of the screen in high, and thus possible to provide both a high see-through capability and a good visibility of images of the screen 21. It is possible to display an image by scattering the image light efficiently and evenly, while providing the see-through capability of the screen 21. Particularly, to control the segmented regions 22 to be placed in the visual state, the applying voltage by the synchronous controller 31 to the control electrode 27 is firstly at the second voltage V2 which is higher than the first voltage V1, and then lowered to a voltage which is equal to or lower than the first voltage V1 which can allow the segmented region 22 to be placed in its maximum scattering state. With this voltage, it is possible to minimize the switching time to scattering state with a stable transmittance of parallel rays.

Embodiment 3

With Embodiment 3, modifications of the display apparatus 1 according to the above-described embodiments will be explained. With Embodiment 3, to reduce the uneven luminance further and so forth to the above-described embodiments, a half-cycled voltage is applied to each of the control electrodes 27.

Figure 19:
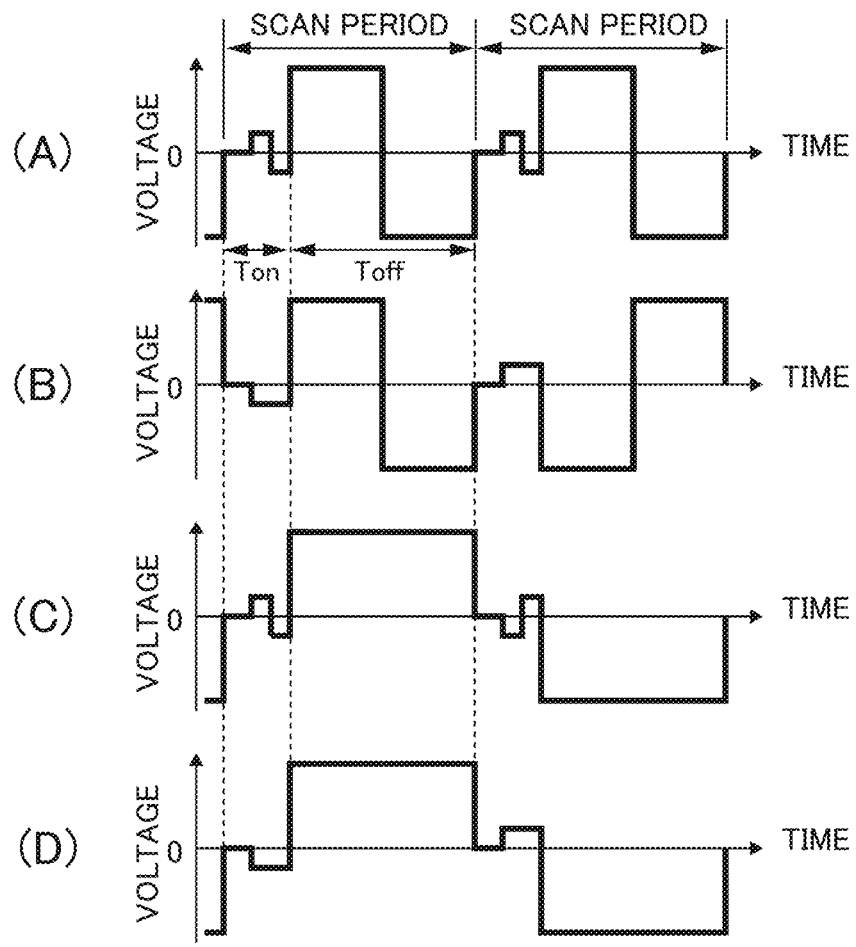
FIG. 19 is a schematic timing chart showing half cycled voltage waveforms with two levels in Embodiment 3 (for the screen in the normal mode)

FIG. 19 is a schematic timing chart showing half cycled voltage waveforms with two levels in Embodiment 3. The waveforms shown in FIG. 19 are applied to the screen 21 in the normal mode. With Embodiment 1 as shown in FIG. 19(A), in the latter half part of the period Ton including the visualizing period, a low alternative voltage with several cycles is applied to each of the segmented regions 22 of the screen 21 operated in the normal mode, and in the no visualizing period Toff, a high alternative voltage with several cycles is applied thereto. When the alternative voltage is applied, the polarity of the applied voltage is changed. Further, the orientation of the optical layer 25 is changed. Thereby, dipping is emerged in the transmittance of parallel rays, that is, spikes are emerged in the scattering state. If this phenomenon occurs during the partial scanning period TP in which the scattering state should be equalized and maintained, the scattering state is changed, and therefore the image quality may deteriorate.

To avoid the problem, as shown in FIGS. 19(B) to 19(D) of the present embodiment, the applied voltage has a monopole square waveform, in the period Ton including the visualizing period, for example. The applying time of the square formed voltage may be the same period as in Embodiment 1. To be more specific, as shown in FIG. 19(B), in the latter half of the period Ton including the visualizing period, the low applying voltage has a half squared wave (half-cycled wave) whose polarity is not changing in the period. As shown in FIG. 19(C), in the no visualizing period Toff, the applying voltage has a half squared wave. As shown in FIG. 19(D), both of the low applying voltage in the latter half part of the period Ton including the visualizing period and the applying voltage in the no visualizing period Toff have half squared waves respectively. As shown in FIGS. 19(B) to 19(D) with the half-cycled wave, monopole voltages can be used in the period Ton including the visualizing period and/or the no visualizing period Toff. Then, it is possible to avoid spikes from being emerged. Moreover, it is possible to reduce the power consumption by employing the half-cycled waveform.

However, when the half-cycled waveform is applied, a DC bias is applied to the optical layer 25 effectively in each of the scanning periods. Therefore, as described in FIGS. 19(B) to 19(D), the polarities are reversed by the unit of a frame, between the odd-numbered scanning periods and the even-numbered scanning periods. Here, for example in the case shown in FIG. 19(B), the phase of the voltage waveform in the no visualizing period Toff is shifted by a half-cycle thereof, by the unit of the scanning period, and the no visualizing period Toff follows the period Ton including the visualizing period. Without the shifting, the transmitting state changes by the double of the period (by the half frequency), and then a haze or flicker is likely to appear in the entire screen.

Figure 20:
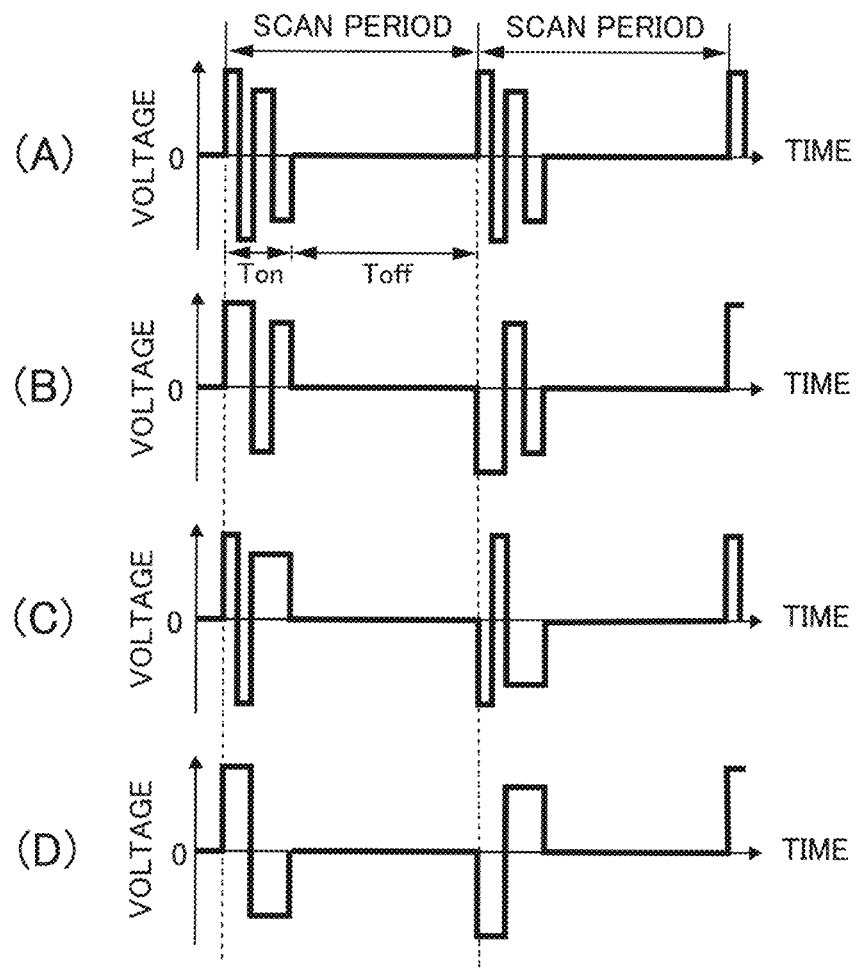
FIG. 20 is a schematic timing chart showing half cycled voltage waveforms with two levels in Embodiment 3 (for the screen in the reverse mode)

FIG. 20 is a schematic timing chart showing half cycled voltage waveforms with two levels in Embodiment 3. The waveforms shown in FIG. 20 are applied to the screen 21 in the reverse mode. With Embodiment 2 as shown in FIG. 20(A), in the visualizing period, an alternative voltage with several cycles is applied to each of the segmented regions 22 of the screen 21 operating in the reverse mode. In this case, in the period Ton including the visualizing period, the polarity of the voltage is changed. Further, the orientation of the optical payer 25 is changed. When the polarity of the applied voltage is changed in the period Ton including the visualizing period, a dip is likely to appear in the transmittance of parallel rays, that is, spikes are likely to appear in the scattering state. If this phenomenon occurs during the partial scanning period TP for which a constant scattering state should be maintained, the scattering state is changed, and therefore the image quality may deteriorate.

To avoid this problem, as shown in FIGS. 20(B) to 20(D) with the present embodiment, the applying voltage has a monopole square waveform, in the period Ton including the visualizing period, for example. The applying time of the squared waveform may be the same period as in Embodiment 2. To be more specific, as shown in FIG. 20(B), in the first half part of the period Ton including the visualizing period, the high applying voltage has a half squared wave (half-cycled wave). As shown in FIG. 20(C), in the latter half part of the no visualizing period Toff, the low applying voltage has a half squared wave. As shown in FIG. 20(D), both of a high applying voltage in the first half part of the period Ton including the visualizing period and a low applying voltage in the latter half part thereof have half squared waves respectively. As shown in FIGS. 20(B) to 20(D) with the half-cycled wave, monopole voltages can be used in the period Ton including the visualizing period. Then, it is possible to avoid spikes from being emerged. Moreover, it is possible to reduce the power consumption by employing the half-cycled waveform.

However, when the half-cycled waveform is applied, a DC bias is applied to the optical layer 25 effectively in each of the scanning periods. Therefore, as described in FIGS. 20(B) to 20(D), the polarities are reversed by the unit of a frame, between the odd-numbered scanning periods and the even-numbered scanning periods. In addition, as shown in FIG. 20(C), in a case of the reverse mode, it is preferable to shift the phase of the waveform at the rise time by a half-cycle.

As described above, with the present embodiment, the half-cycled voltage waveform is applied to control the optical state of the segmented regions 22, and therefore the scattering state is not likely to change in the period Ton including the visualizing period, and/or the transmitting state is not likely to change in the no visualizing period Toff. In addition, as shown in FIG. 19(C), the voltage is applied to maintain the segmented regions 22 in the transmitting state during the no visualizing period Toff of the screen 21 in the normal mode, and the applied voltage has a monopole squared waveform or a bipolar rectangular shaped waveform in one scanning period T with (2m+1)/2 cycles, where m is an integer. By this means, it is possible to reduce the frequency in the high voltage applying period as low as possible, and therefore to reduce the consumption power. Here, the m-cycled periods in the rectangular shaped wave are not necessary to be constant. In addition, in FIG. 20(B), the high monopole voltage is applied in the first part of the period Ton including the visualizing period of the screen 21 in the reverse mode. By this means, it is possible to eliminate the following problem. That is, if a bipolar waveform is used as the rising high voltage, time consumption is emerged for rising the optical capability at every polarity changing timing, especially in a case in which a region with large load capacity (large display area, for example) is driven and the rising of the applied voltage is slow. As a result, the haze is increased in the operation. As shown in FIG. 20(B), by applying the high monopole square formed voltage at its beginning time, the time consumption caused by the polarity changing is decreased, the haze is reduced, and therefore the display quality is improved, even in a case in which a region with large load capacity for a large display area is needed to be driven. Here, in FIG. 20(B), a DC bias is effectively applied, and therefore it is preferred to reverse the polarity in every scan period. Then, in the latter half of the period Ton including the visualizing period, the phase of the low applied voltage may be shifted by a half-cycle in every scan period. Without the shifting, the scattering state is changed by the double periods (by the half frequency), and therefore a flicker is likely to appear in the displayed image. Moreover, as shown in FIG. 19(D) and in FIG. 20(D), by the combination of half-wave voltages, it is possible to improve the effect. When this method is employed, as the voltage difference between the first voltage V1 and the second voltage V2 will be in a DC bias practically, and therefore it is preferable to reverse the polarity in every scan period.

As described above, with the present embodiment, the synchronism controller 31 makes the applying voltage to the control electrode 27 in a half-cycled voltage in which the polarity does not change within the applying period. Therefore, for the screen 21 in the normal mode, it is possible to reduce the change of the transmittance of parallel rays, which occurs when an alternative voltage is applied, and therefore it is possible to reduce the uneven luminance in the latter half part of the visualizing period and to reduce the change of the transmittance of parallel rays in the no visualizing period. Meanwhile, for the screen 21 in the reverse mode, it is possible to reduce the change of transmittance of parallel rays, which occurs when an alternative voltage is applied, and further to reduce uneven luminance in the latter half part of the visualizing period.

Moreover, with the present embodiment, in the plurality of scanning periods T for the scanning of image light, the synchronism controller 31 switches the polarity of the applying voltage to the control electrodes 27 by the unit of the scanning period T. Therefore, although a DC voltage is applied to the optical layer 25 in every scanning period T, in the plurality of the scanning period T, the DC components in the applying voltage can be evened and reduced.

Embodiment 4

Figure 21:
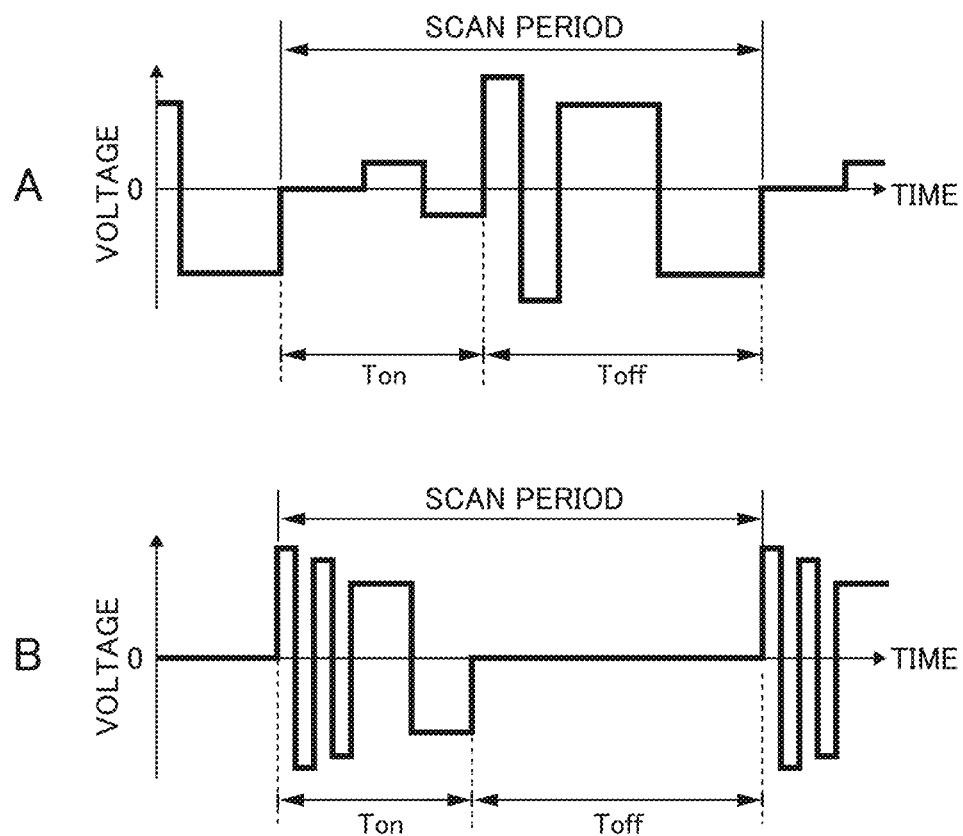
FIGS. 21A and 21B are schematic timing chart showing a driving voltage waveform with three levels in Embodiment 4.

With Embodiment 4, a modification of the display apparatus 1 according to the above-described embodiments will be explained. With Embodiment 4, the display apparatus 1 having the control electrodes 27 that are applied the voltage with three or more levels will be explained. FIG. 21 is a schematic timing chart showing a driving voltage waveform with three levels according to Embodiment 4.

FIG. 21(A) shows a driving voltage waveform with three levels that is applied to the control electrodes 27 of the screen 21 in the normal mode. The horizontal axis represents the time, and the vertical axis represents the voltage. In FIG. 21(A), the driving voltage is an alternative voltage with three kinds of amplitudes, that is, has six levels and 0V. At the beginning part of the no visualizing period Toff for each of the segmented regions 22 being controlled in the transmitting state, a voltage wave with the intermediate level is applied and the level is different from the applied voltage level in the latter half part thereof. With the additional level, it is possible to speed up a return speed from the scattering state to the transmitting state.

FIG. 21(B) shows a driving voltage waveform with three levels which is applied to the control electrodes 27 of the screen 21 in the reverse mode. In FIG. 21(B), the driving voltage is an alternative voltage with three amplitudes, that is, has six levels and 0V. This driving voltage applies an alternative voltage in the period Ton including the visualizing period, with three amplitude levels, that is, with six levels and 0V. To be more specific, the voltage waveform apply a different intermediate level from the both levels in the rising period from transmitting state to the scattering state and in the holding period in a constant scattering state. By this means, even in a case in which the response times are different one another between a plural of the segmented regions 22 in one screen 21, it is possible to reduce the influence of the differences.

Embodiment 5

Figure 22:
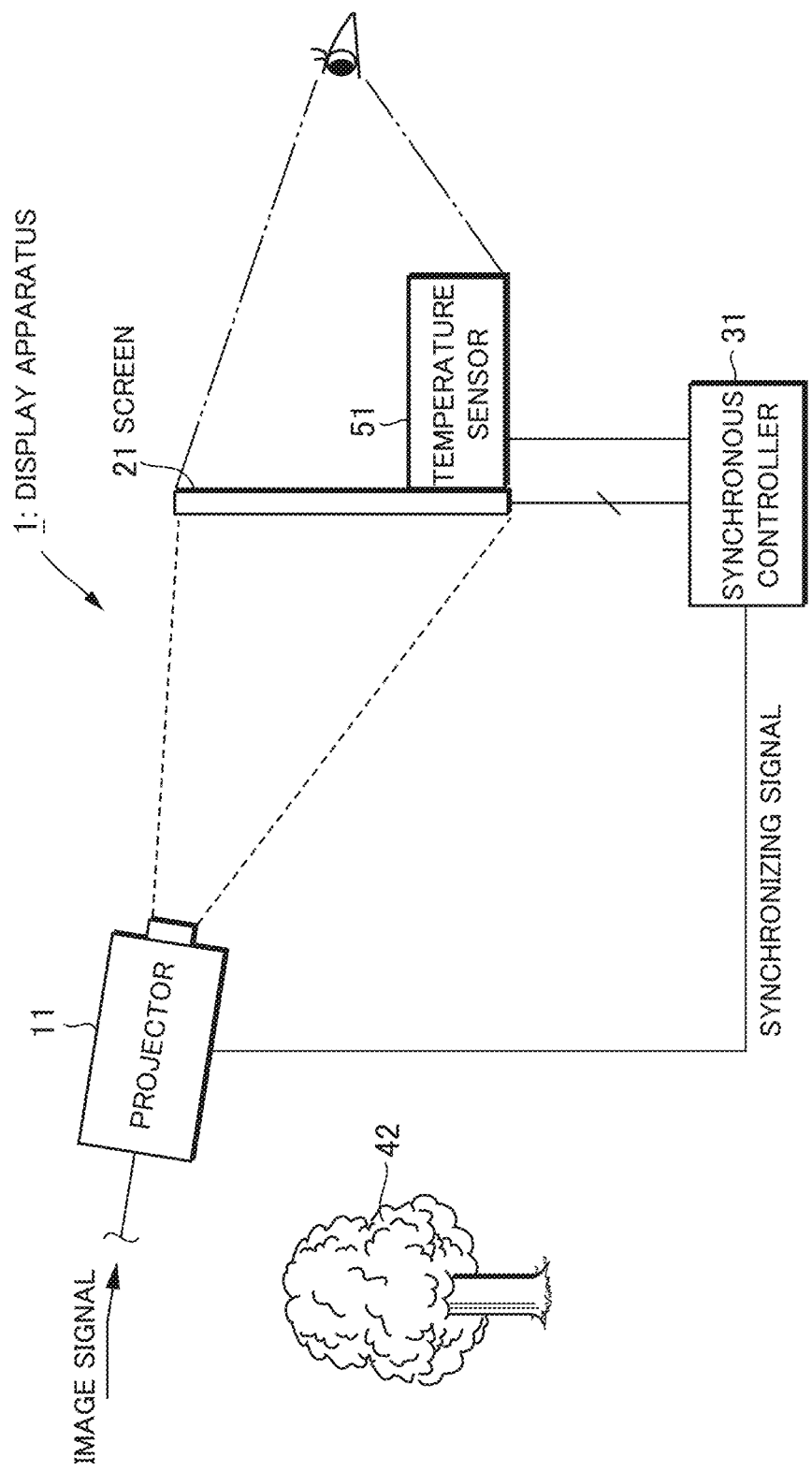
FIG. 22 is a schematic view showing the configuration of a display apparatus in Embodiment 5.

With Embodiment 5, a modification of the display apparatus 1 according to the above-described embodiments will be explained. FIG. 22 is a schematic view showing the configuration of the display apparatus 1 according to Embodiment 5. As shown in FIG. 22, the display apparatus 1 according to Embodiment 5 includes a temperature sensor 51. The temperature sensor 51 is mounted on the screen 21 to detect the temperature of the screen 21. The temperature sensor 51 is connected to the synchronism controller 31 to output a detecting signal indicating the detected temperature.

The synchronism controller 31 controls the driving voltage waveforms, based on the detected panel temperature with the temperature sensor 51. The synchronism controller 31 changes the voltage or amplitude of the drive waveform, based on the detected temperature, for example. Alternatively, the synchronism controller 31 changes the pulse period or the alternative frequency of the drive waveform, based on the detected temperature. Otherwise, the synchronism controller 31 changes both of the voltage and the pulse period or the alternative frequency of the drive waveform, based on the detected temperature. Here, the synchronism controller 31 may determine the driving voltage and so forth for changing in accordance with the detected temperature, by using a preset reference table in which the relationship between the detected temperature and the driving voltage is set and predetermined, for example. In addition to this, the synchronism controller 31 may determine the driving voltage and so forth for changing in accordance with the detected temperature, by using a preset reference table in which the relationship between the detected temperature and the driving voltage waveform is set and predetermined and by determining the interpolated values in the waveform.

As described above, the display apparatus 1 according to the present embodiment functions as a drive system including a detection system of the temperature of the screen 21 and a control system of the drive waveform. Moreover, with the present embodiment, even in a case in which the response speed of the screen 21 changes depending on the temperature of the screen 21 or the temperature of liquid crystal therein, it is possible to reduce the luminance changes due to the change of the response speed.

Figure 23:
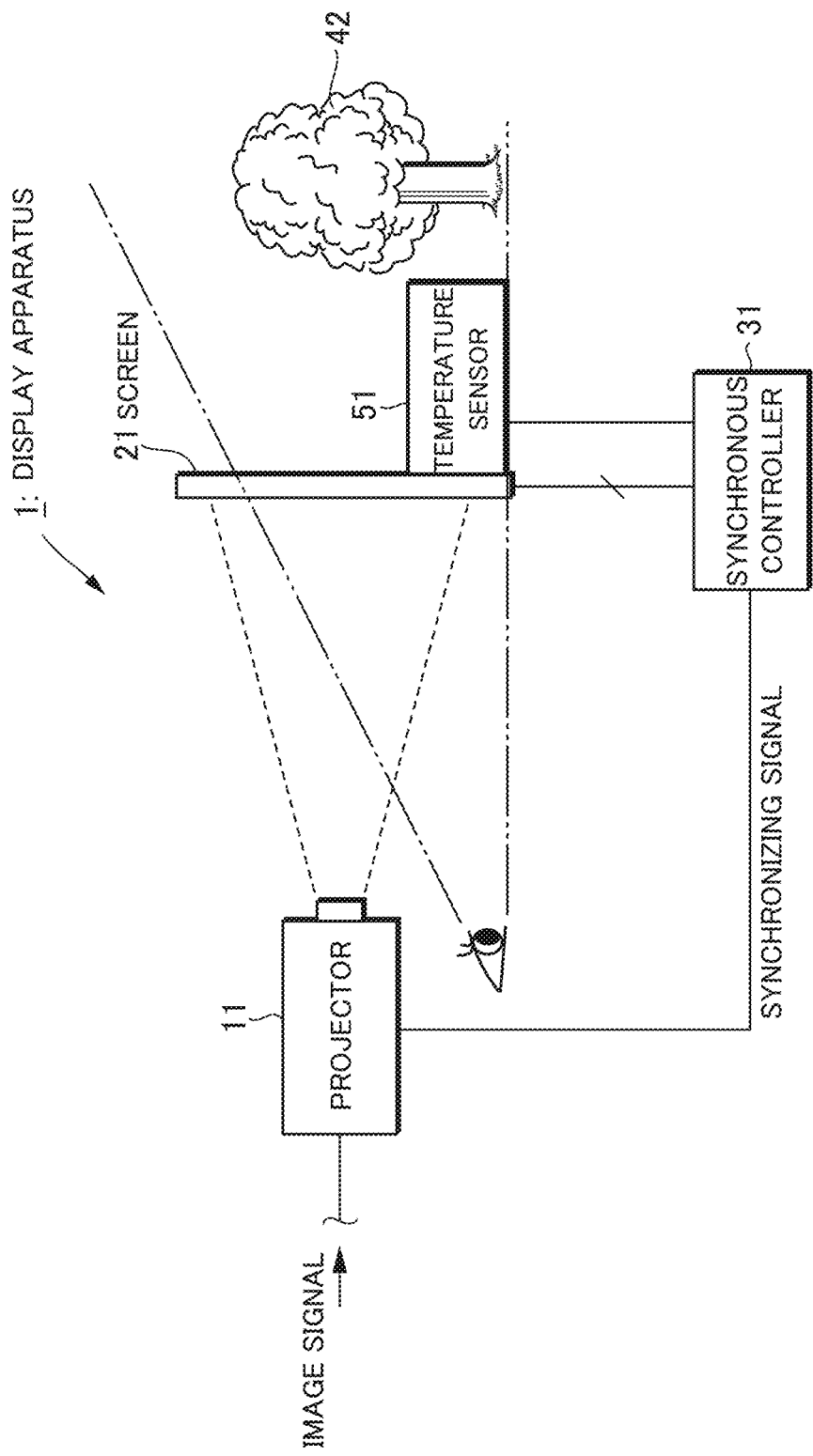
FIG. 23 is a schematic view showing a modification example of the display apparatus of Embodiment 2 of the present invention, in which a reflective screen is used.

Although the preferred embodiments have been explained, it is by no means limiting, but it will be appreciated that various modifications and alternations are possible within the scope of the invention. For example, with the above-described embodiments, the screen 21 is controlled to be placed in the scattering state as the visual state, and therefore transmitting and scattering the image light. In addition to this, the screen 21 may be controlled to be placed in the scattering state with a high degree, and therefore scattering and reflecting the image light. In this case, the screen 21 functions as a reflective screen located between the projector 11 and the viewer. FIG. 23 is a schematic view showing a modification of the display apparatus 1 according to Embodiment 2 of the present invention, using a reflective screen 21. In FIG. 23, the projector 11 is located in the viewer side with respect to the reflective screen 21. In this case, by applying the present invention, as shown in FIG. 9, it is possible to display both of the image 41 formed by image light and the back side image 42 behind the screen 21 in a overlapped state one another on the screen 21.

REFERENCE SIGNS LIST 1 display apparatus
11 projector
21 screen
22 segmented region
25 optical layer
27 control electrode
31 synchronous controller (controller)
51 temperature sensor
T scanning period
TP partial scanning period Ton period including the visualizing period
Toff no visualizing period

The invention claimed is:

1. A display apparatus comprising:
a screen having an optical layer whose optical state is changed by applying a voltage and a plurality of control electrodes arranged side by side along the optical layer to apply the voltage to the optical layer;
a projector configured to project image light on the screen to display an image; and
a controller configured to apply the voltage to the plurality of control electrodes, to switch the optical state of the screen by the unit of each of segmented regions corresponding to the each of the control electrodes, between a predetermined visual state in which the image light is scattered and a nonvisual state which is different from the visual state, in a projection period of the image light,
wherein the controller switches the optical state of each of the plurality of segmented regions in the projection period of the image light, in synchronous with the projection of the image light by the projector, to control the optical state of the projected region of the image light in the visual state, and to maintains the optical state as the visual state with the voltage with two or more amplitudes.

2. The display apparatus according to claim 1, wherein:
the projector scans the screen with the image light; and
the controller switches the applying voltage to the plurality of segmented regions in a scanning period of the image light in the scanning order, as each of the segmented regions both to be controlled in the visual state while being scanned in each of partial scanning period, and to be controlled in the nonvisual state in a period while not being scanned.

3. The display apparatus according to claim 2, wherein:
the screen operates in a normal mode in which a transmittance of parallel rays is increased when the voltage is applied, and scatters the projected image light in the visual state; and
the controller:
applies the voltage to the control electrode corresponding to the segmented region controlled to be placed in the nonvisual state so as to control the voltage applied segmented region to be placed in a transmitting state; and
controls the applying voltage to the segmented region in the visual state in lower value than that in the nonvisual state so as to control the scanning segmented region with the image light in the scattering state and to scatter the image light.

4. The display apparatus according to claim 3, wherein the controller, in order to control the segmented region to be placed in the visual state,
increases the applying voltage after stopping the application of the voltage to the control electrode,
maintains the optical state of the segmented region in a predetermined scattering state which is in a lower degree than the maximum scattering state of the segmented region, and
stabilizes the scattering state of the segmented region during the partial scanning period for the scanning of the image light.

5. The display apparatus according to claim 2, wherein:
the screen operates in a reverse mode in which an intensity of the scattering is increased by applying the voltage, and scatters the projected image light; and
the controller:
stops the application of the voltage to the control electrode corresponding to the segmented region to be placed in the nonvisual state so as to control the segmented region in the transparent and transmitting state; and
applies the voltage to the control electrode corresponding to the segmented region controlled to be placed in the visual state so as to control the segmented region to be scanned by the image light and to scatter the image light.

6. The display apparatus according to claim 5, wherein the controller, in order to control the segmented region to be placed in the visual state,
decreases the applying voltage after starting the application of the voltage to the control electrode,
maintains the optical state of the segmented region, and
stabilizes the scattering state of the segmented region during the partial scanning period for the scanning of the image light.

7. The display apparatus according to claim 6, wherein the controller, to control the segmented region in the visual state,
applies a first voltage to the control electrode, the voltage is higher than the voltage for controlling the segmented region in the maximum scattering state as the, and then
applies another voltage which is lower than the first voltage and is the voltage for the maximum scattering state.

8. The display apparatus according to claim 7, wherein the controller, to control the segmented region in the visual state, changes the applying voltages from the first voltage at the timing when the scattering is maximized with the first voltage.

9. The display apparatus according to claim 1, wherein the controller applies the voltage to the control electrode in an alternating voltage at a low frequency.

10. The display apparatus according to claim 1, wherein the controller, in a plurality of projecting periods for the image light, switches the polarity of the applying voltage to the control electrodes by the unit of the projection period, so as to reduce the DC component of the applying voltage to the optical layer.

11. A method of driving a display apparatus configured to display an image formed by projected image light from a projector, on a screen having an optical layer whose optical state is changed in accordance with an applied voltage, the display apparatus including a controller that controls the optical state of the screen by:
applying the voltage to a plurality of control electrodes arranged side by side along the optical layer, to display the image formed by the image light on the screen which has the plurality of control electrodes;
switching the optical state of the screen between a predetermined visual state to scatter the image light and a nonvisual state which is different from the visual state, by the unit of the segmented regions in accordance with the control electrodes, in the projection period of the image light;
switching optical states of the plurality of segmented regions in the projection period of the image light, in synchronous with the projection of the image light by the projector, so as to control the optical state of the projected region of the screen to be placed in the visual state; and
maintaining the optical state in the visual state with the voltage with two or more amplitudes.

12. A screen apparatus for displaying comprising:
- a screen configured to display an image formed by projecting image light, the screen having an optical layer whose optical state is changed by applying a voltage; and a plurality of control electrodes arranged side by side along the optical layer to apply the voltage to the optical layer; and
- a controller configured to apply the voltage to the plurality of control electrodes, and to switch the optical state of each of segmented regions corresponding with the control electrodes, between a predetermined visual state in which the image light is scattered and a nonvisual state which is different from the visual state, wherein:
- the controller, in the projection period of the light, switches the optical state of each of the plurality of segmented regions in synchronous with the projection of the image light onto the screen, so as to control the optical state of a projected region of the image light in the visual state, and
- maintains the optical state as the visual state with the voltage with two or more amplitudes.

13. The display apparatus according to claim 2, wherein the controller applies the voltage to the control electrode in an alternating voltage at a low frequency.

14. The display apparatus according to claim 3, wherein the controller applies the voltage to the control electrode in an alternating voltage at a low frequency.

15. The display apparatus according to claim 4, wherein the controller applies the voltage to the control electrode in an alternating voltage at a low frequency.

16. The display apparatus according to claim 5, wherein the controller applies the voltage to the control electrode in an alternating voltage at a low frequency.

17. The display apparatus according to claim 6, wherein the controller applies the voltage to the control electrode in an alternating voltage at a low frequency.

18. The display apparatus according to claim 7, wherein the controller applies the voltage to the control electrode in an alternating voltage at a low frequency.

19. The display apparatus according to claim 2, wherein the controller, in a plurality of projecting periods for the image light, switches the polarity of the applying voltage to the control electrodes by the unit of the projection period, so as to reduce the DC component of the applying voltage to the optical layer.

20. The display apparatus according to claim 3, wherein the controller, in a plurality of projecting periods for the image light, switches the polarity of the applying voltage to the control electrodes by the unit of the projection period, so as to reduce the DC component of the applying voltage to the optical layer.

* * * * *